United States Patent
Zenkyu et al.

(10) Patent No.: US 11,438,032 B2
(45) Date of Patent: Sep. 6, 2022

(54) OAM RECEPTION APPARATUS, OAM RECEPTION METHOD, AND OAM TRANSMISSION SYSTEM

(71) Applicant: NEC Corporation, Tokyo (JP)

(72) Inventors: Ryuji Zenkyu, Tokyo (JP); Eisaku Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/288,666

(22) PCT Filed: Oct. 8, 2019

(86) PCT No.: PCT/JP2019/039684
§ 371 (c)(1),
(2) Date: Apr. 26, 2021

(87) PCT Pub. No.: WO2020/090378
PCT Pub. Date: May 7, 2020

(65) Prior Publication Data
US 2021/0399766 A1    Dec. 23, 2021

(30) Foreign Application Priority Data
Nov. 2, 2018    (JP) .............................. JP2018-207742

(51) Int. Cl.
*H04L 23/02*    (2006.01)
*H04B 7/00*    (2006.01)
(Continued)

(52) U.S. Cl.
CPC ............... *H04B 7/002* (2013.01); *H04B 1/10* (2013.01); *H04B 7/0417* (2013.01); *H04B 7/0697* (2013.01)

(58) Field of Classification Search
CPC ... H04L 1/0054; H04L 1/005; H04L 27/2647; H04L 5/0007; H04L 1/0618; H04B 7/0456
(Continued)

(56) References Cited

U.S. PATENT DOCUMENTS

2004/0087290 A1*  5/2004  Schmidt ............ H04L 25/03006
                                                          455/213
2010/0290552 A1   11/2010  Sasaki
(Continued)

FOREIGN PATENT DOCUMENTS

JP    2013-211887 A    10/2013
JP    2017-515337 A    6/2017
(Continued)

OTHER PUBLICATIONS

International Search Report for PCT Application No. PCT/JP2019/039684, dated Jan. 7, 2020.
(Continued)

*Primary Examiner* — Khai Tran

(57) ABSTRACT

An OAM reception apparatus (30) includes an OAM reception unit (34) and an interference compensation unit (35C) that are independent of each other. The OAM reception unit (34) and the interference compensation unit (35C) execute "OAM reception processing" and "interference compensation processing", respectively, based on a plurality of vertical component signals and a plurality of horizontal component signals obtained by performing polarization separating and down-conversion on a plurality of reception radio signals received by a plurality of reception antenna elements (31-1 to 31-4).

13 Claims, 14 Drawing Sheets

(51) Int. Cl.
  *H04B 1/10*       (2006.01)
  *H04B 7/0417*     (2017.01)
  *H04B 7/06*       (2006.01)

(58) Field of Classification Search
  USPC .......................................... 375/262, 260, 267
  See application file for complete search history.

(56) References Cited

U.S. PATENT DOCUMENTS

| | | | |
|---|---|---|---|
| 2017/0170574 A1 | 6/2017 | Sacco et al. | |
| 2017/0331543 A1 | 11/2017 | Hirase et al. | |
| 2018/0249357 A1* | 8/2018 | Futaki | H04B 17/318 |
| 2020/0145065 A1* | 5/2020 | Ashrafi | H04L 5/0014 |

FOREIGN PATENT DOCUMENTS

| | | |
|---|---|---|
| JP | 2018-037744 A | 3/2018 |
| WO | 2016/063315 A | 4/2016 |

OTHER PUBLICATIONS

Gil, Gye-Tae et al., "Dual Polarized UCA-Based OAM Multi-mode Transmission with Inter-mode Spreading", 2018 IEEE 87th Vehicular Technology Conference (VTC Spring), Jun. 3-6, 2018, IEEEXplore, Jul. 26, 2018.

Bai, Xudong et al., "Experimental Array for Generating Dual Circularly-Polarized Dual Mode OAM Radio Beams", Scientific Reports, Jan. 10, 2017, pp. 1-7.

Wu, Xiong et al., "Inter-Mode Crosstalk Compensation for Radio Orbital Angular Momentum Multiplexing Systems under Misaligned Condition Using Multiple-Input Multiple-Output Techniques", 2016 15th International Conference on Optical Communications and Networks (ICOCN), Sep. 24-27, 2016, IEEE Xplore, Mar. 13, 2017.

* cited by examiner $$e^{i\frac{2\pi}{4}} \cdot \begin{bmatrix} 0 & 0 & 0 & 0 \\ 0 & 1 & 2 & 3 \\ 0 & 2 & 0 & 2 \\ 0 & 3 & 2 & 1 \end{bmatrix}$$

Fig. 13

OAM RECEPTION APPARATUS, OAM RECEPTION METHOD, AND OAM TRANSMISSION SYSTEM

This application is a National Stage Entry of PCT/JP2019/039684 filed on Oct. 8, 2019, which claims priority from Japanese Patent Application 2018-207742 filed on Nov. 2, 2018, the contents of all of which are incorporated herein by reference, in their entirety.

TECHNICAL FIELD

The present disclosure relates to an OAM reception apparatus, an OAM reception method, and an OAM transmission system.

BACKGROUND ART

A radio communication system which performs radio communication by combining spatial multiplexing transmission and dual polarized wave transmission of vertically and horizontally polarized wave transmission has been proposed (e.g., Patent Literature 1). In the radio communication system disclosed in Patent Literature 1, spatial demultiplexing processing for demultiplexing a spatial multiplexed signal spatially multiplexed by MIMO (multiple-input and multiple-output) and inter-polarization interference compensation processing for compensating inter-polarization interference are executed in series (i.e., independently and sequentially executed).

On the other hand, a radio transmission system (i.e., orbital angular momentum (OAM) transmission system) using electromagnetic waves having OAM has recently attracted attention (e.g., Patent Literature 2).

CITATION LIST

Patent Literature

Patent Literature 1: Japanese Unexamined Patent Application Publication No. 2013-211887
Patent Literature 2: International Patent Publication No. WO 2016/063315

SUMMARY OF INVENTION

Technical Problem

However, no method has yet been proposed for receiving a signal wirelessly transmitted by a combination of OAM transmission and dual polarized wave transmission with inter-polarization interference compensation.

An object of the present disclosure is to provide an OAM reception apparatus, an OAM reception method, and an OAM transmission system that can receive a signal wirelessly transmitted by a combination of OAM transmission and dual polarized wave transmission with inter-polarization interference compensation.

Solution to Problem

An OAM reception apparatus according to a first example aspect includes: a plurality of reception antenna elements configured to receive a plurality of radio signals respectively transmitted from a plurality of transmission antenna elements of an OAM (orbital angular momentum) transmission apparatus, each radio signal including a first OAM radio signal and a second OAM radio signal that are formed by a common OAM (orbital angular momentum) mode, the first OAM radio signal being transmitted by vertically polarized waves, the second OAM radio signal being transmitted by horizontally polarized waves; and an OAM reception unit and an interference compensation unit configured to execute OAM reception processing using an OAM reception weight vector and interference compensation processing for removing an interference component between the polarized waves, respectively, based on a plurality of vertical component signals and a plurality of horizontal component signals obtained by performing polarization separating and down-conversion on a plurality of reception radio signals received by the plurality of reception antenna elements, the OAM reception unit and the interference compensation unit being independent of each other.

An OAM reception method according to a second example aspect is an OAM reception method executed by an OAM reception apparatus including a plurality of reception antenna elements configured to respectively receive a plurality of radio signals that are respectively transmitted from a plurality of transmission antenna elements of an OAM (orbital angular momentum) transmission apparatus, each radio signal including a first OAM radio signal and a second OAM radio signal that are formed by a common OAM (orbital angular momentum) mode, the first OAM radio signal being transmitted by vertically polarized waves, the second OAM radio signal being transmitted by horizontally polarized waves, the OAM reception method including causing OAM reception means and interference compensation means to execute, on a plurality of vertical component signals and a plurality of horizontal component signals obtained by performing polarization separating and down-conversion on a plurality of reception radio signals received by the plurality of reception antenna elements, OAM reception processing using an OAM reception weight vector and interference compensation processing for removing an interference component between the polarized waves, the OAM reception unit and the interference compensation unit being independent of each other.

An OAM transmission system according to a third example aspect is an OAM transmission system including an OAM transmission apparatus and an OAM reception apparatus, in which the OAM transmission apparatus is configured to transmit a plurality of radio signals from a plurality of transmission antenna elements, each radio signal including a first OAM radio signal and a second OAM radio signal that are formed by a common OAM (orbital angular momentum) mode, the first OAM radio signal being transmitted by vertically polarized waves, the second OAM radio signal being transmitted by horizontally polarized waves, and the OAM reception apparatus includes: a plurality of reception antenna elements configured to receive the transmitted plurality of radio signals; and an OAM reception unit and an interference compensation unit configured to execute OAM reception processing using an OAM reception weight vector and interference compensation processing for removing an interference component between the polarized waves, respectively, on a plurality of vertical component signals and a plurality of horizontal component signals obtained by performing polarization separating and down-conversion on a plurality of reception radio signals received by the plurality of reception antenna elements, the OAM reception unit and the interference compensation unit being independent of each other.

Advantageous Effects of Invention

The present disclosure provides an OAM reception apparatus, an OAM reception method, and an OAM transmission system that can receive a signal wirelessly transmitted by a combination of OAM transmission and dual polarized wave transmission with inter-polarization interference compensation.

BRIEF DESCRIPTION OF DRAWINGS

FIG. 13 shows an example of a basic weight matrix (OAM transmission weight matrix)

DESCRIPTION OF EMBODIMENTS

Example embodiments will be described below with reference to the drawings. In the example embodiments, the same or equivalent elements are denoted by the same reference signs, and repeated description is omitted.

First Example Embodiment

<Overview of OAM Transmission System>

Figure 1:
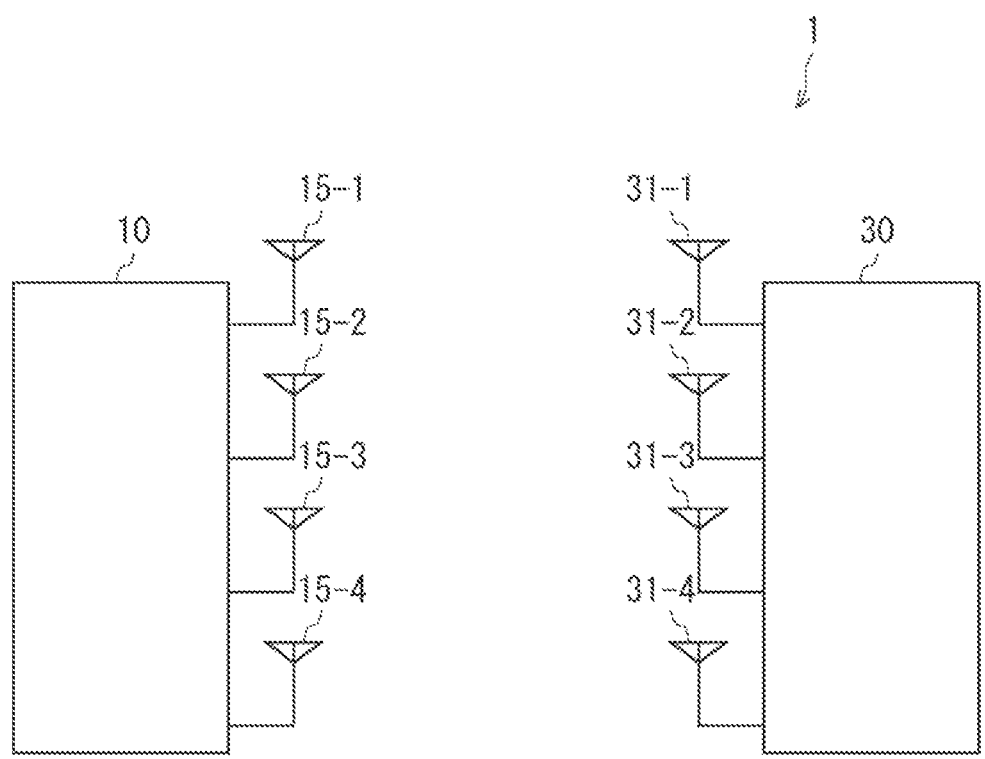
FIG. 1 is a diagram showing an example of an OAM transmission system according to a first example embodiment.

FIG. 1 shows an example of an OAM transmission system according to a first example embodiment. In FIG. 1, an OAM transmission system 1 includes an OAM transmission apparatus 10 and an OAM reception apparatus 30. The OAM transmission apparatus 10 and the OAM reception apparatus 30 are, for example, fixedly installed and used in a line-of-sight environment.

In FIG. 1, the OAM transmission apparatus 10 includes antenna elements 15-1 to 15-4. The OAM reception apparatus 30 includes antenna elements 31-1 to 31-4. In the following description, the antenna elements 15-1 to 15-4 are sometimes collectively referred to as "antenna elements 15". Further, the antenna elements 31-1 to 31-4 are sometimes collectively referred to as "antenna elements 31". Here, the number of antenna elements 15 and the number of antenna elements 31 are four, but the number is not limited to four, and may be two or more.

The antenna elements 15-1 to 15-4 are placed, for example, in a circular array. That is, the antenna elements 15 constitute a UCA (Uniform Circular Array) antenna. The antenna elements 31-1 to 31-4 are arranged in, for example, a circular array. That is, the antenna elements 31 constitute a UCA (Uniform Circular Array) antenna.

The OAM transmission apparatus 10 transmits "a plurality of radio signals" from the antenna elements 15-1 to 15-4, respectively. Each radio signal includes a "first OAM radio signal" and a "second OAM radio signal" that are formed by a common OAM mode, the "first OAM radio signal" being transmitted by vertically polarized waves, the "second OAM radio signal" being transmitted by horizontally polarized waves.

The OAM reception apparatus 30 receives a plurality of radio signals transmitted from the antenna elements 15-1 to 15-4 of the OAM transmission apparatus 10 by each of the antenna elements 31-1 to 31-4. That is, the radio signal received by each of the antenna elements 31 is a radio signal in which a plurality of radio signals transmitted from the antenna elements 15-1 to 15-4 are spatially multiplexed.

<Configuration Example of OAM Transmission Apparatus>

Figure 2:
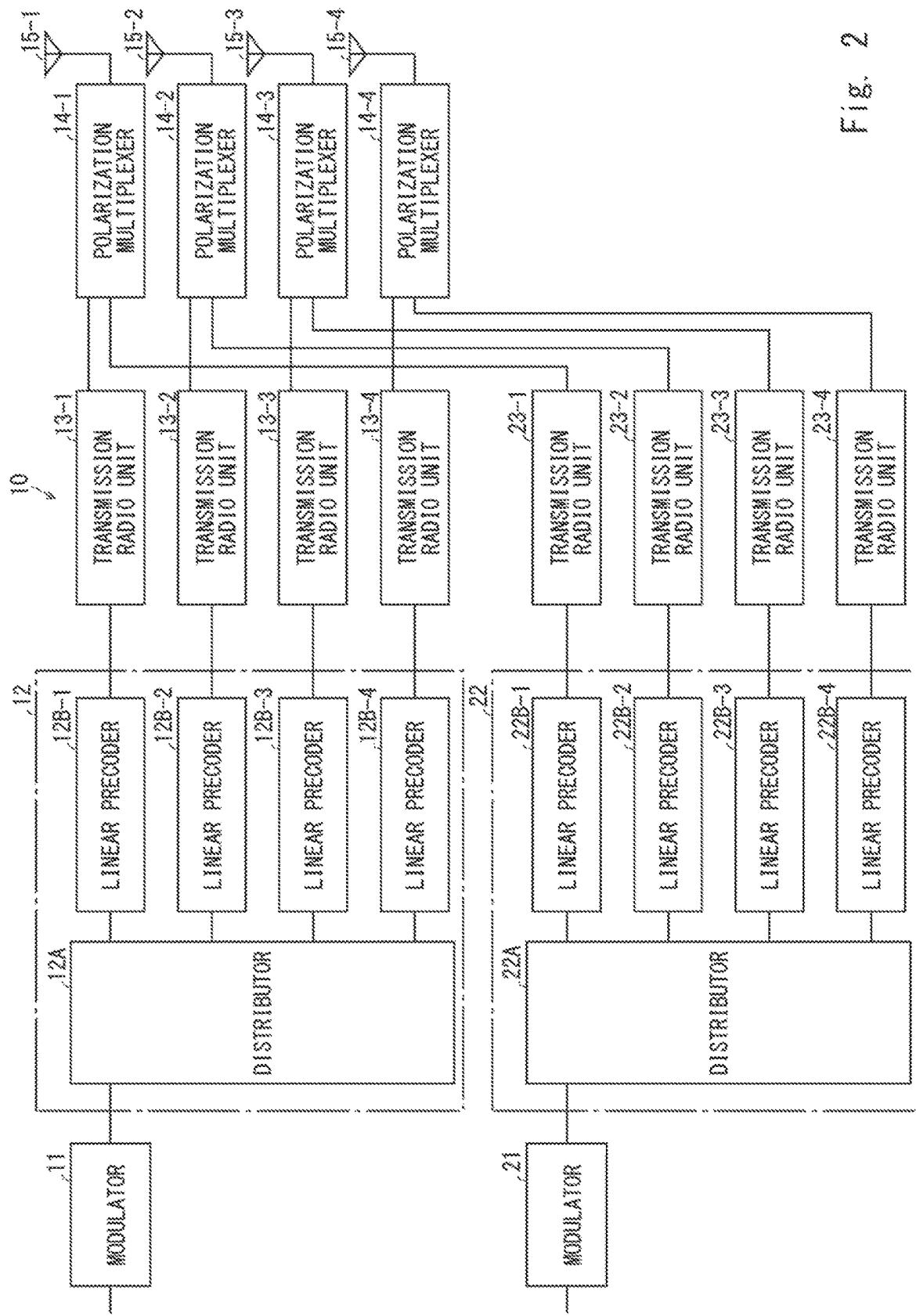
FIG. 2 is a block diagram showing an example of an OAM transmission apparatus according to the first example embodiment.

FIG. 2 is a block diagram showing an example of the OAM transmission apparatus according to the first example embodiment. In FIG. 2, the OAM transmission apparatus 10 includes modulators 11 and 21, signal forming units 12 and 22, transmission radio units 13-1 to 13-4 and 23-1 to 23-4, polarization multiplexers 14-1 to 14-4, and the antenna elements 15-1 to 15-4. The transmission radio units 13-1 to 13-4 may be collectively referred to as "transmission radio units 13". Further, the transmission radio units 23-1 to 23-4 may be collectively referred to as "transmission radio units 23". Furthermore, the polarization multiplexers 14-1 to 14-4 may be collectively referred to as "polarization multiplexers 14".

The modulators 11 and 21 receive different transmission streams. Then, each of the modulators 11 and 21 modulates the input transmission stream and outputs a resulting modulated signal (i.e., symbols). That is, two different symbols are output from the modulators 11 and 21 around the same time.

The signal forming unit 12 includes a distributor 12A and linear precoders 12B-1 to 12B-4.

The distributor 12A distributes each symbol output from the modulator 11 to the linear precoders 12B-1 to 12B-4.

The linear precoders 12B-1 to 12B-4 multiply the distributed symbol by each of four vector elements of "basic weight vector (OAM transmission weight vector)" corresponding to the OAM modes (used OAM modes) to be used and thereby obtain symbols that have been subjected to OAM transmission processing. Then, the linear precoders 12B-1 to 12B-4 output the symbols that have been subjected to the OAM transmission processing to the transmission radio units 13-1 to 13-4, respectively. Here, when the used OAM mode is a mode (+1), the vector elements of "OAM transmission weight vector" are shifted by $\pi/2$ between one another.

The transmission radio units 13-1 to 13-4 receive the symbols that have been subjected to the OAM transmission processing from the linear precoders 12B-1 to 12B-4, respectively, and perform transmission radio processing (digital-to-analog conversion, up-conversion, etc.) on the received symbols. The transmission radio units 13-1 to 13-4 output the radio signals obtained by the transmission radio processing to the polarization multiplexers 14-1 to 14-4, respectively.

The signal forming unit 22 basically performs the same processing as that performed by the signal forming unit 12. The signal forming unit 22 includes a distributor 22A and linear precoders 22B-1 to 22B-4.

The distributor 22A distributes each symbol output from the modulator 21 to the linear precoders 22B-1 to 22B-4.

The linear precoders 22B-1 to 22B-4 multiply the distributed symbol by each of four vector elements of "basic weight vector (OAM transmission weight vector)" corresponding to the OAM modes (used OAM modes) to be used and thereby obtain symbols that have been subjected to OAM transmission processing. The used OAM modes of the linear precoders 22B-1 to 22B-4 are the same as those of the used OAM modes of the linear precoders 12B-1 to 12B-4. That is, the OAM transmission weight vectors used in the linear precoders 22B-1 to 22B-4 are the same as the OAM transmission weight vectors used in the linear precoders 12B-1 to 12B-4. Then, the linear precoders 22B-1 to 22B-4 output the symbols that have been subjected to the OAM transmission processing to the transmission radio units 23-1 to 23-4, respectively.

The transmission radio units 23-1 to 23-4 receive the symbols that have been subjected to the OAM transmission processing from the linear precoders 22B-1 to 22B-4, respectively, and perform transmission radio processing (digital-to-analog conversion, up-conversion, etc.) on the received symbols. The transmission radio units 23-1 to 23-4 output the radio signals obtained by the transmission radio processing to the polarization multiplexers 14-1 to 14-4, respectively.

The polarization multiplexers 14-1 to 14-4 convert the radio signals received from the transmission radio units 13-1 to 13-4 into vertically polarized signals, convert the radio signals received from the transmission radio units 23-1 to 23-4 into horizontally polarized signals, and output the polarization multiplexed radio signals of the vertically polarized signals and the horizontally polarized signals to the antenna elements 15-1 to 15-4, respectively. Thus, the polarization multiplexed radio signals are transmitted from the antenna elements 15-1 to 15-4 according to the used OAM modes. That is, the modulator 11, the signal forming unit 12, and the transmission radio units 13-1 to 13-4 are processing units for forming transmission signals of vertically polarized waves, while the modulator 21, the signal forming unit 22, and the transmission radio units 23-1 to 23-4 are processing units for forming transmission signals of horizontally polarized waves.

<Configuration Example of OAM Reception Apparatus>

Figure 3:
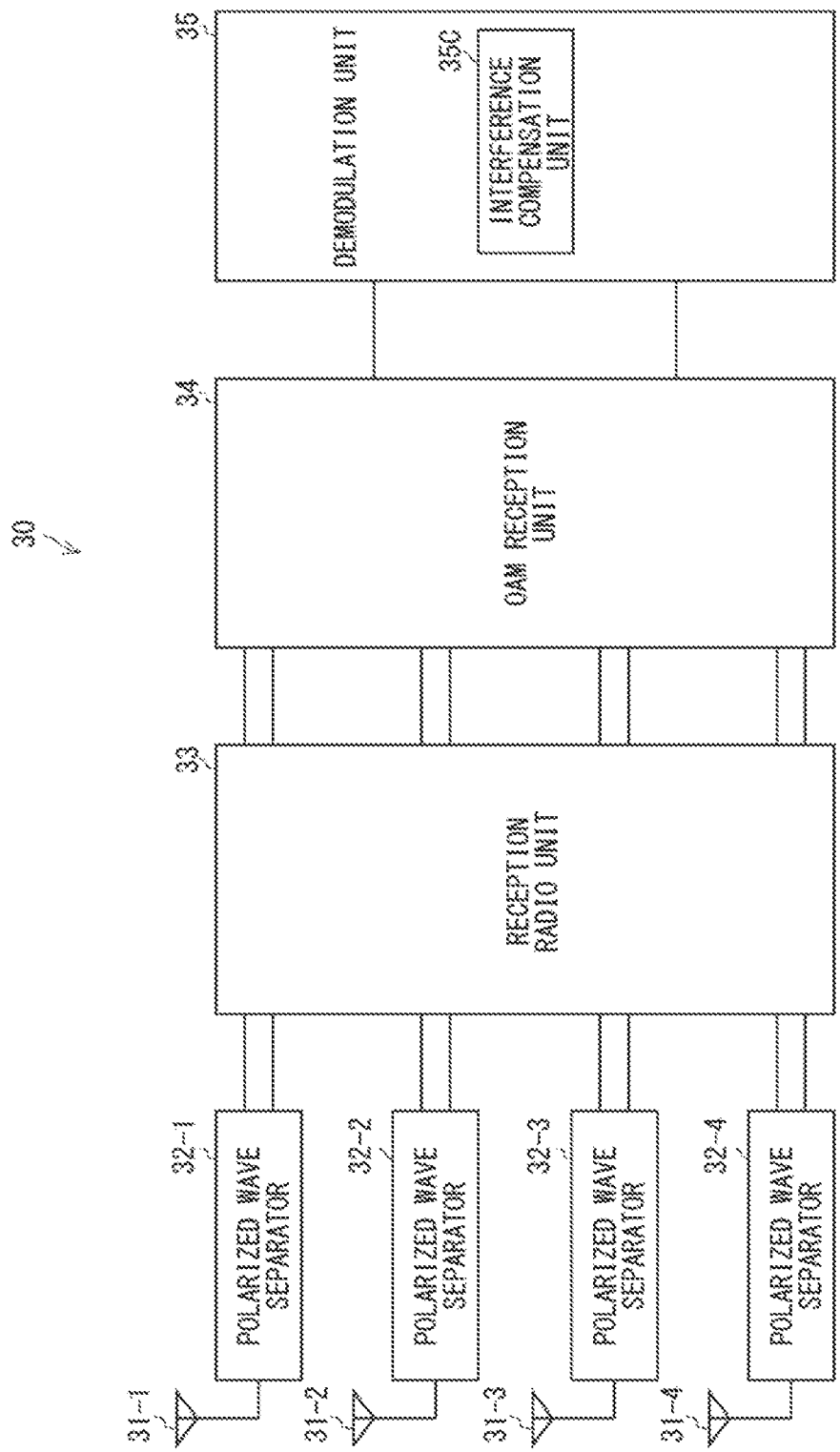
FIG. 3 is a block diagram showing an example of an OAM reception apparatus according to the first example embodiment.

FIG. 3 is a block diagram showing an example of the OAM reception apparatus according to the first example embodiment. In FIG. 3, the OAM reception apparatus 30 includes the antenna elements 31-1 to 31-4, polarized wave separators 32-1 to 32-4, a reception radio unit 33, an OAM reception unit 34, and a demodulation unit 35 including an interference compensation unit 35C. The polarized wave separators 32-1 to 32-4 may be collectively referred to as "polarized wave separators 32".

The antenna elements 31-1 to 31-4 receive a plurality of radio signals (i.e., spatial multiplexed signals) transmitted from the antenna elements 15-1 to 15-4 of the OAM transmission apparatus 10, respectively, and output the radio signals to the polarized wave separators 32-1 to 32-4, respectively.

The polarized wave separators 32-1 to 32-4 are connected to the antenna elements 31-1 to 31-4, respectively. Each polarized wave separator 32 performs polarization separating on the reception radio signal received from the antenna element 31 into a "vertical component signal" and a "horizontal component signal" and outputs them to the reception radio unit 33. That is, four vertical component signals and four horizontal component signals are output from the polarized wave separators 32-1 to 32-4.

The reception radio unit 33 performs reception radio processing (down conversion, analog-to-digital conversion, etc.) on each of the four vertical component signals and the four horizontal component signals received from the polarized wave separators 32-1 to 32-4. Then, the reception radio unit 33 outputs the four vertical component signals and the four horizontal component signals that have been subjected to the reception radio processing to the OAM reception unit 34.

The OAM reception unit 34 executes "OAM reception processing" using an "OAM reception weight vector" on the four vertical component signals and the four horizontal component signals received from the reception radio unit 33. By doing so, signals which have been subjected to the OAM reception processing and which correspond to the four vertical component signals and signals which have been subjected to the OAM reception processing and which correspond to the four horizontal component signals are obtained.

The demodulation unit 35 executes demodulation processing on each of the signals obtained by the OAM reception unit 34; that is, on each of the signals which have been subjected to the OAM reception processing and which correspond to the vertical component signals and the signals which have been subjected to the OAM reception processing and which correspond to the horizontal component signals. The demodulation unit 35 includes an interference compensation unit 35C which executes "interference compensation processing" for removing an interference component between polarized waves. That is, the OAM reception unit 34 and the interference compensation unit 35C are connected in series (in cascade).

Note that the above description has been given in accordance with the assumption that interference compensation processing for inter-polarization interference is executed after the OAM reception processing is executed, but this is merely an example, and the order of execution of these processing may be reversed. That is, the interference compensation unit 35C may be disposed in an input stage of the OAM reception unit 34.

As described above, according to the first example embodiment, the OAM reception apparatus 30 includes the OAM reception unit 34 and the interference compensation unit 35C that are independent of each other. The OAM reception unit 34 and the interference compensation unit 35C execute "OAM reception processing" and "interference compensation processing", respectively, based on a plurality of vertical component signals and a plurality of horizontal component signals obtained by performing polarization separating and down-conversion on a plurality of respective reception radio signals received by the plurality of reception antenna elements 31-1 to 31-4.

By the above configuration of the OAM reception apparatus 30, it is possible to receive, with inter-polarization interference compensation, a signal wirelessly transmitted by a combination of OAM transmission and dual polarized wave transmission.

Second Example Embodiment

In a second example embodiment, a more specific configuration of the OAM reception apparatus will be described. A basic configuration of the OAM reception apparatus according to the second example embodiment is the same as that of the OAM reception apparatus 30 according to the first example embodiment.

<Configuration Example of OAM Reception Apparatus>

Figure 4:
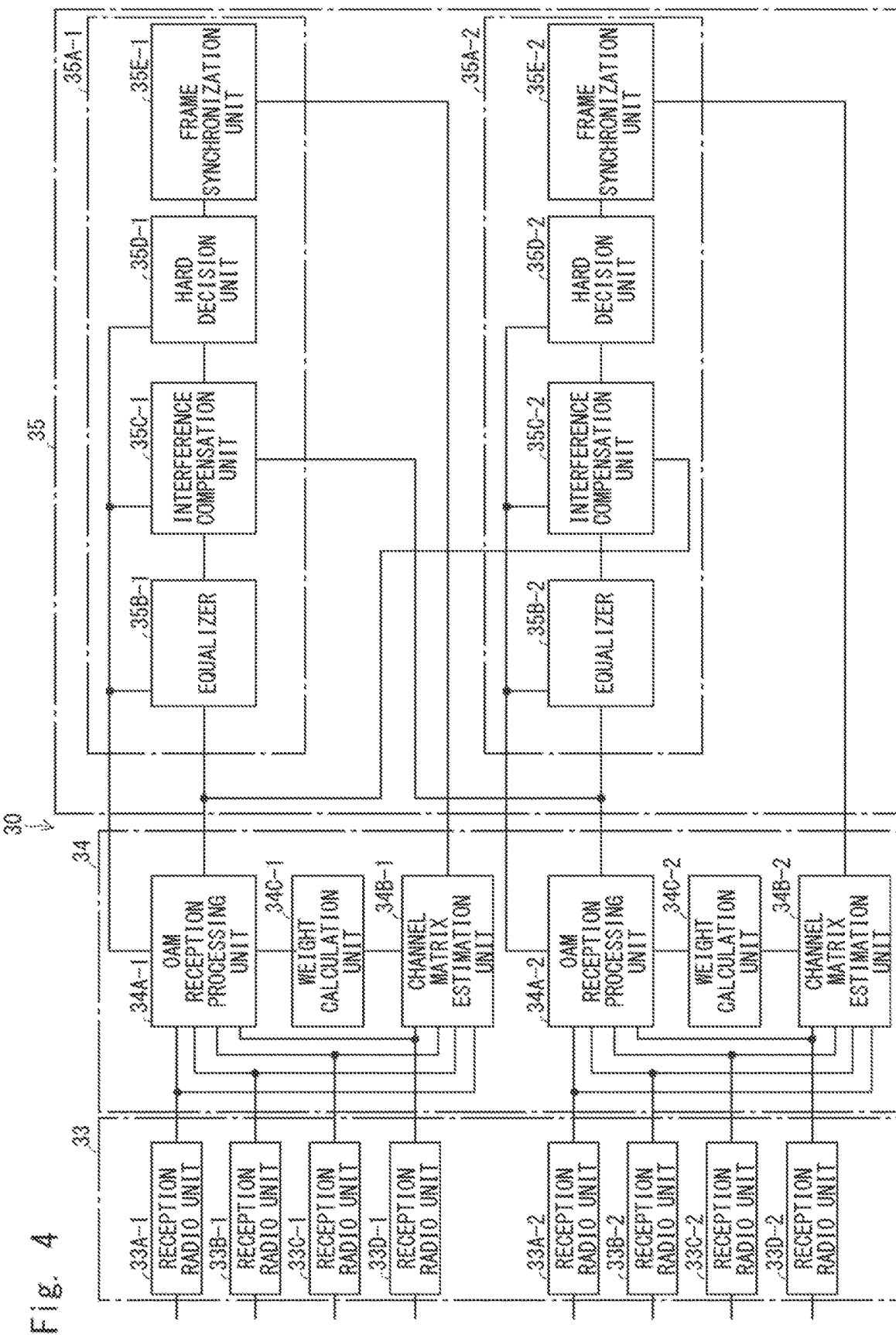
FIG. 4 is a block diagram showing an example of an OAM reception apparatus according to a second example embodiment.

FIG. 4 is a block diagram showing an example of the OAM reception apparatus according to the second example embodiment. FIG. 4 shows a part (the reception radio unit 33, the OAM reception unit 34, and the demodulation unit 35) of the OAM reception apparatus 30 according to the second example embodiment, and components other than these units are not shown.

In FIG. 4, the OAM reception apparatus 30 includes the reception radio unit 33, an OAM reception unit 34, and the demodulation unit 35.

The reception radio unit 33 includes reception radio units 33A-1, 33A-2, 33B-1, 33B-2, 33C-1, 33C-2, 33D-1, and 33D-2. The reception radio units 33A-1 and 33A-2 are connected to the polarized wave separator 32-1. The reception radio units 33B-1 and 33B-2 are connected to the polarized wave separator 32-2. The reception radio units 33C-1 and 33C-2 are connected to the polarized wave separator 32-3. The reception radio units 33D-1 and 33D-2 are connected to the polarized wave separator 32-4. The reception radio units 33A-1, 33B-1, 33C-1, and 33D-1 receive the vertical component signals from the polarized wave separators 32-1 to 32-4, respectively, and perform the reception radio processing. The reception radio units 33A-2, 33B-2, 33C-2, and 33D-2 receive the horizontal component signals from the polarized wave separators 32-1 to 32-4, respectively, and perform the reception radio processing.

The OAM reception unit 34 includes OAM reception processing units 34A-1 and 34A-2, channel matrix estimation units 34B-1 and 34B-2, and weight calculation units 34C-1 and 34C-2. The OAM reception processing unit 34A-1, the channel matrix estimation unit 34B-1, and the weight calculation unit 34C-1 are function units that execute OAM reception processing corresponding to vertical component signals. On the other hand, the OAM reception processing unit 34A-2, the channel matrix estimation unit 34B-2, and the weight calculation unit 34C-2 are function units that execute OAM reception processing corresponding to horizontal component signals.

The channel matrix estimation unit 34B-1 calculates a "channel matrix (first channel matrix)" based on the four vertical component signals that have been subjected to the reception radio processing, the four vertical component signals that have been subjected to the reception radio processing being received from the reception radio units 33A-1, 33B-1, 33C-1, and 33D-1 and corresponding to known signals (e.g., pilot signals) transmitted by vertically polarized waves from the OAM transmission apparatus 10. The "first channel matrix" is a channel matrix related to channels between the antenna elements 15-1 to 15-4 and the antenna elements 31-1 to 31-4.

The weight calculation unit 34C-1 corrects a conjugate transpose matrix of the "basic weight vector" corresponding to the above "used OAM mode" based on the first channel matrix calculated by the channel matrix estimation unit 34B-1 and calculates an initial value of a "first OAM reception weight vector". The initial value of the "first OAM reception weight vector" is set in the OAM reception processing unit 34A-1.

The OAM reception processing unit 34A-1 multiplies the four vertical component signals which have been subjected to the reception radio processing by the "first OAM receive weight vector", the four vertical component signals which have been subjected to the reception radio processing being received from the reception radio units 33A-1, 33B-1, 33C-1, and 33D-1 and corresponding to the data signals transmitted by vertically polarized waves from the OAM transmission apparatus 10, and executes "first OAM reception processing". Here, the OAM reception processing unit 34A-1 executes the "first OAM reception processing" while adjusting (updating) the "first OAM reception weight vector" based on a "first error vector signal" received from a hard decision unit 35D-1 described later. By this configuration, adaptive first OAM reception processing can be performed.

The channel matrix estimation unit 34B-2 calculates a "channel matrix (second channel matrix)" based on the four horizontal component signals that have been subjected to the reception radio processing, the four horizontal component signals that have been subjected to the reception radio processing being received from the reception radio units 33A-2, 33B-2, 33C-2, and 33D-2 and corresponding to known signals (e.g., pilot signals) transmitted by horizontally polarized waves from the OAM transmission apparatus 10. The "second channel matrix" is a channel matrix between the antenna elements 15-1 to 15-4 and the antenna elements 31-1 to 31-4.

The weight calculation unit 34C-2 corrects the conjugate transpose matrix of the "basic weight vector" corresponding to the above "used OAM mode" based on the second channel matrix calculated by the channel matrix estimation unit 34B-2 and calculates an initial value of a "second OAM reception weight vector". The initial value of the "second OAM reception weight vector" is set in the OAM reception processing unit 34A-2.

The OAM reception processing unit 34A-2 multiplies the four horizontal component signals which have been subjected to the reception radio processing by the "second OAM receive weight vector", the four horizontal component signals which have been subjected to the reception radio processing being received from the reception radio units 33A-2, 33B-2, 33C-2, and 33D-2 and corresponding to the data signals transmitted by horizontally polarized waves from the OAM transmission apparatus 10, and executes "second OAM reception processing". Here, the OAM reception processing unit 34A-1 executes the "second OAM reception processing" while adjusting (updating) the "second OAM reception weight vector" based on a "second error vector signal" received from a hard decision unit 35D-2 described later. By this configuration, adaptive second OAM reception processing can be performed.

Figure 5:
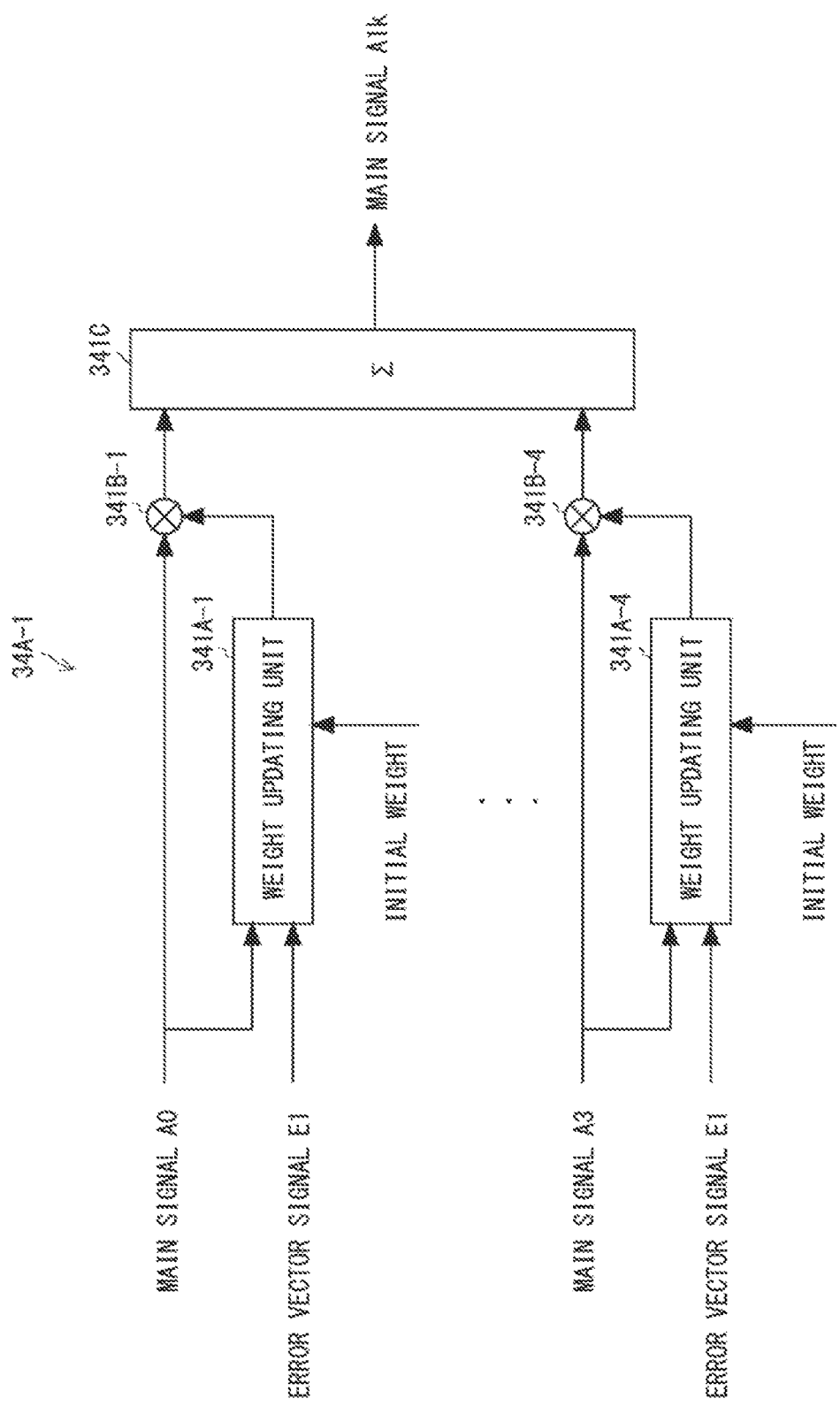
FIG. 5 is a block diagram showing an example of a weight updating unit.

FIG. 5 is a block diagram showing an example of the OAM reception processing unit in the OAM reception apparatus according to the second example embodiment. In FIG. 5, the OAM reception processing unit 34A-1 includes weight updating units 341A-1 to 341A-4, multipliers 341B-1 to 341B-4, and an adder 341C. Note that the OAM reception processing unit 34A-2 has the same configuration as that of the OAM reception processing unit 34A-1. In FIG. 5, the main signals A0, A1, A2, and A3 are signals output from the reception radio units 33A-1 to 33D-1, respectively. Further, an error vector signal E1 represents an error vector signal output from the hard decision unit 35D-1 described later. Further, an initial weight is an initial value of the "first OAM reception weight vector" calculated by the weight calculation unit 34C-1.

The main signals A0, A1, A2, and A3 are input to the weight updating units 341A-1 to 341A-4, respectively. For example, the weight updating unit 341A-1 updates an OAM reception weight held by the weight updating unit 341A-1 based on the main signal A0 and the error vector signal E1, and outputs the updated OAM reception weight to the multiplier 341B-1. Likewise, the weight updating units 341A-2 to 341A-4 output the updated OAM reception weights to the multipliers 341B-2 to 341B-4, respectively.

The multipliers 341B-1 to 341B-4 receive the main signals A0, A1, A2, and A3, respectively. The multipliers 341B-1 to 341B-4 receive updated OAM reception weights from the weight updating units 341A-1 to 341A-4. Each multiplier 341B multiplies the input main signal by the OAM reception weight and outputs the multiplication result to the adder 341C.

The adder 341C adds the four multiplication results received from the multipliers 341B-1 to 341B-4, and outputs the addition result as a signal A1k that has been subjected to the OAM reception processing.

Figure 6:
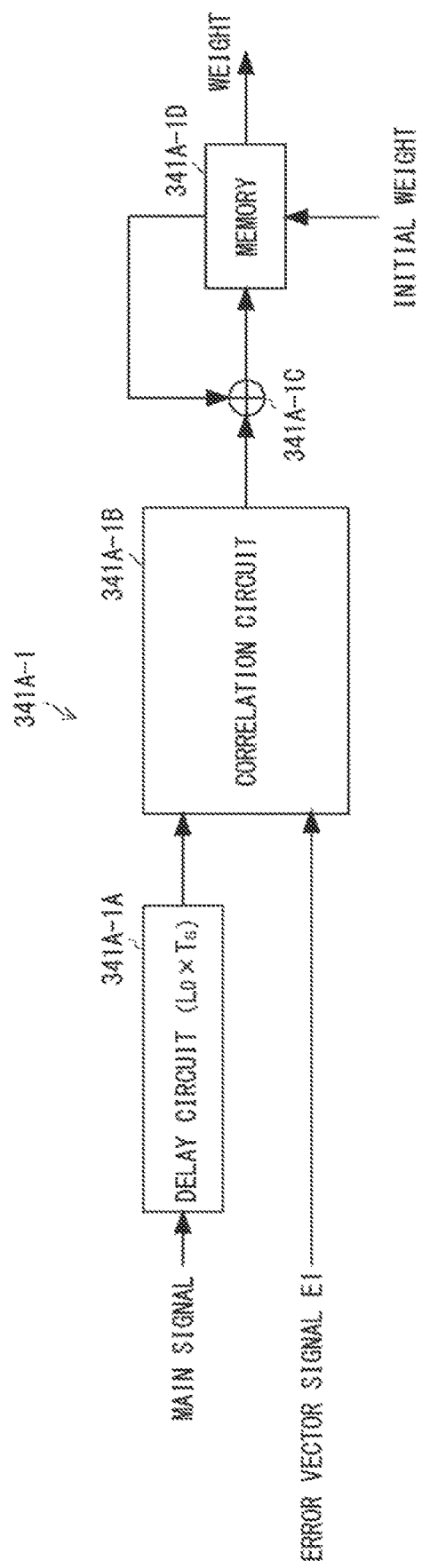
FIG. 6 is a diagram showing an example of a hardware configuration of a control apparatus.

FIG. 6 is a block diagram showing an example of the weight updating unit. Since the configurations of the weight updating units 341A-1 to 341A-4 are the same, the configuration of the weight updating unit 341A-1 is shown in FIG. 6 as an example. In FIG. 6, the weight updating unit 341A-1 includes a delay circuit 341A-1A, a correlation circuit 341A-1B, an adder 341A-1C, and a memory 341A-1D.

The delay circuit 341A-1A holds the input main signal for a period of time ($L_0 \times Ts$) and then outputs the main signal. In other words, the delay circuit 341A-1A delays the input main signal by the time ($L_0 \times Ts$). The time ($L_0 \times Ts$) corresponds to a time required until the error vector signal E1 corresponding to the main signal at a certain timing is fed back (i.e., feedback delay time). Ts represents a symbol time. $L_0$ represents the number of symbol times Ts included in the feedback delay time. That is, since the delay circuit 341A-1A delays the main signal by the feedback delay time, the main signal and the error vector signal corresponding to the main signal are input to the correlation circuit 341A-1B around the same time.

The correlation circuit 341A-1B calculates a correlation value using the main signal and the error vector signal, and outputs the calculated correlation value to the adder 341A-1C.

The adder 341A-1C adds the correlation value received from the correlation circuit 341A-1B and a weight received from the memory 341A-1D, and outputs the addition result to the memory 341A-1D.

The memory 341A-1D outputs the weight (holding weight) held by the memory 341A-1D to the adder 341A-1C, updates the holding weight according to the addition result received from the adder 341A-1C, and outputs the updated holding weight to the multiplier 341B-1. The initial weight calculated by the weight calculation unit 34C-1 is first held in the memory 341A-1D, and the initial weight is updated.

As described above, the OAM reception weight vectors are updated by the correlations between the main signals and the error vector signals in the OAM reception processing units 34A-1 and 34A-2.

Returning to the description of FIG. 4, the demodulation unit 35 includes demodulation processing units 35A-1 and 35A-2. The demodulation processing unit 35A-1 is a function unit which is connected to the OAM reception processing unit 34A-1 and which executes demodulation processing corresponding to vertical component signal. The demodulation processing unit 35A-2 is a function unit which is connected to the OAM reception processing unit 34A-2 and which executes demodulation processing corresponding to horizontal component signals.

The demodulation processing unit 35A-1 includes an equalizer 35B-1, an interference compensation unit 35C-1, the hard decision unit 35D-1, and a frame synchronization unit 35E-1.

The equalizer 35B-1 outputs, to the interference compensation unit 35C-1, a signal that has been subjected to distortion component removal processing; that is, a signal that is obtained by removing a distortion component from the signal obtained by the OAM reception processing unit 34A-1. For example, the equalizer 35B-1 filters, by using a plurality of filter coefficients (hereinafter sometimes referred to as "a plurality of third filter coefficients"), the signal obtained by the OAM reception processing unit 34A-1, thereby eliminating the distortion component. Here, the equalizer 35B-1 executes the distortion component removal processing while adjusting (updating) the plurality of third filter coefficients based on the "first error vector signal" received from the hard decision unit 35D-1 described later.

Figure 7:
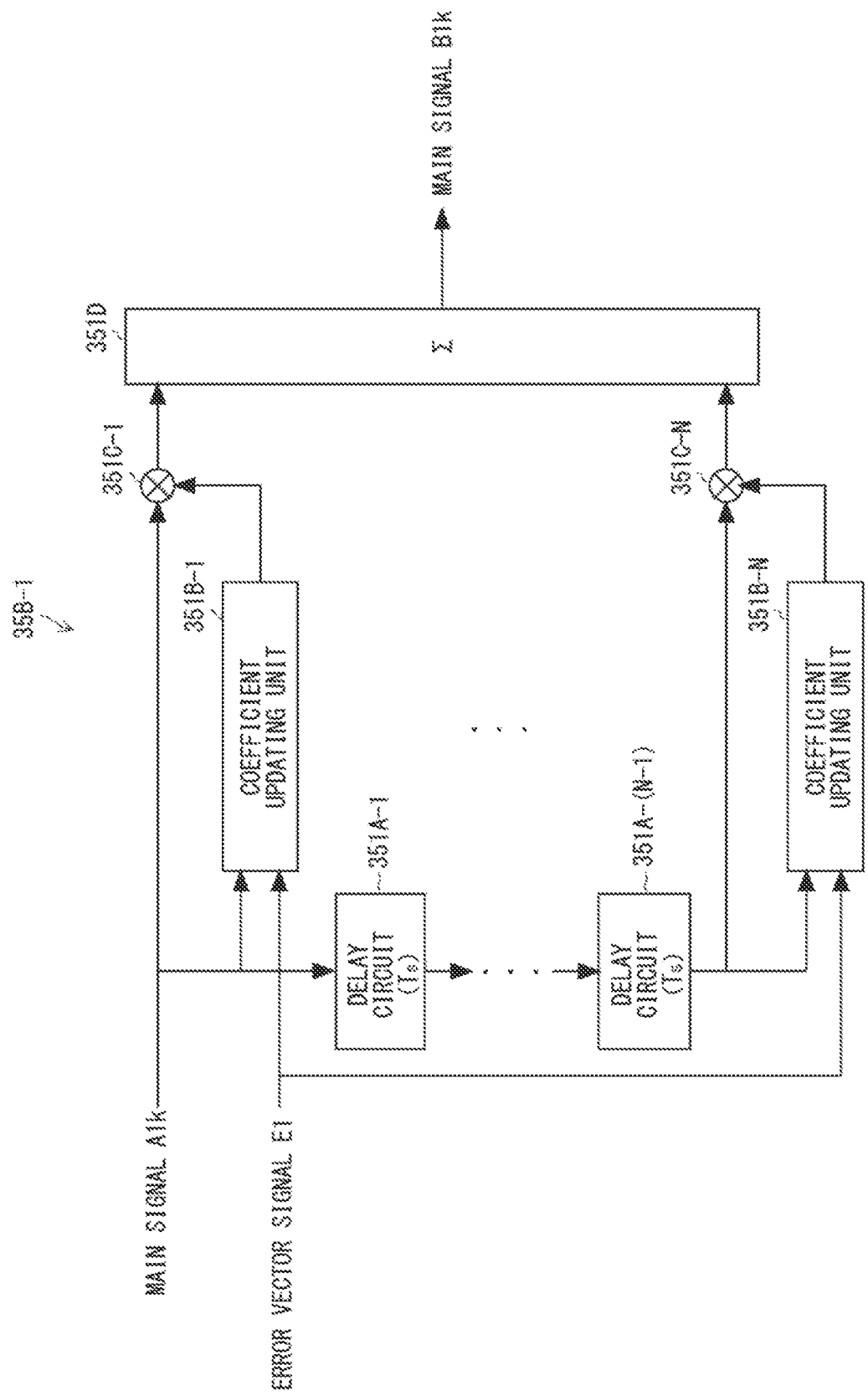
FIG. 7 is a block diagram showing an example of an equalizer in the OAM reception apparatus according to the second example embodiment.

FIG. 7 is a block diagram showing an example of the equalizer in the OAM reception apparatus according to the second example embodiment. In FIG. 7, the equalizer 35B-1 includes delay circuits 351A-1 to 351A-(N-1), coefficient updating units 351B-1 to 351B-N, multipliers 351C-1 to 351C-N, and an adder 351D. Note that an equalizer 35B-2 has the same configuration as that of the equalizer 35B-1. In FIG. 7, the main signal A1k is a signal that has been subjected to the OAM reception processing output from the OAM reception processing unit 34A-1. Further, the error vector signal E1 represents the error vector signal output from the hard decision unit 35D-1 described later.

Each of the delay circuits 351A-1 to 351A-(N-1) delays the input main signal by a time Ts and outputs the delayed signal. The delay circuits 351A-1 to 351A-(N-1) are disposed in the input stages of the coefficient updating units 351B-2 to 351B-N, respectively. As a result, N main signals A1k shifted by the time Ts are input to the coefficient updating units 351B-1 to 351B-N around the same time.

Each of the coefficient updating units 351B updates the filter coefficient held by the corresponding coefficient updating unit 351B based on the input main signal and the error vector signal E1, and outputs the updated filter coefficient to the multiplier 351C.

Each of the multipliers 351C multiplies the main signal A1k by the filter coefficient and outputs the multiplication result to the adder 351D.

The adder 351D adds the N multiplication results received from the multipliers 351C-1 to 351C-N, and outputs the addition result as the equalized signal. As described above, the equalizer 35B-1 is, for example, a FIR (Finite Impulse Response) filter.

Figure 8:
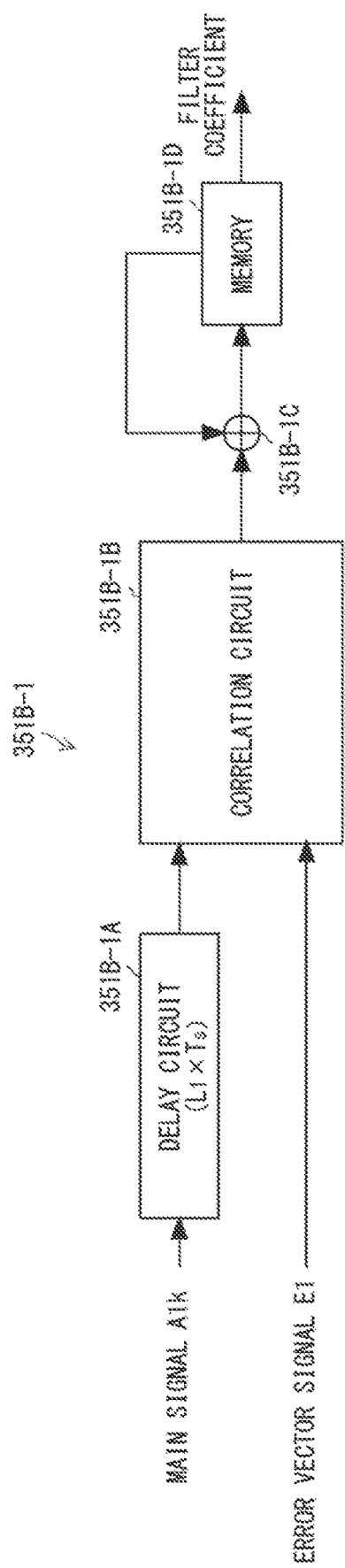
FIG. 8 is a block diagram showing an example of a coefficient updating unit.

FIG. 8 is a block diagram showing an example of the coefficient updating unit. Since the configurations of the coefficient updating units 351B-1 to 351B-N are the same, the configuration of the coefficient updating unit 351B-1 is shown in FIG. 8 as an example. In FIG. 8, the coefficient updating unit 351B-1 includes a delay circuit 351B-1A, a correlation circuit 351B-1B, an adder 351B-1C, and a memory 351B-1D. In FIG. 8, the main signal A1k is a signal that has been subjected to the OAM reception processing output from the OAM reception processing unit 34A-1. Further, the error vector signal E1 represents the error vector signal output from the hard decision unit 35D-1 described later.

The delay circuit 351B-1A holds the input main signal for a period of time ($L_1 \times Ts$) and then outputs the main signal. In other words, the delay circuit 351B-1A delays the input main signal by the time ($L_1 \times Ts$). The time ($L_1 \times Ts$) corresponds to a time required until the error vector signal E1 corresponding to the main signal at a certain timing is fed back (i.e., feedback delay time). $L_1$ represents the number of symbol times Ts included in the feedback delay time. That is, since the delay circuit 351B-1A delays the main signal by the feedback delay time, the main signal and the error vector signal corresponding to the main signal are input to the correlation circuit 351B-1B around the same time.

The correlation circuit 351B-1B calculates a correlation value using the main signal and the error vector signal, and outputs the calculated correlation value to the adder 351B-1C.

The adder 351B-1C adds the correlation value received from the correlation circuit 351B-1B and the filter coefficient received from the memory 351B-1D, and outputs the addition result to the memory 351B-1D.

The memory 351B-1D outputs the filter coefficient (holding filter coefficient) held by the memory 351B-1D to the adder 351B-1C, updates the holding filter coefficient according to the addition result received from the adder 351B-1C, and outputs the updated holding filter coefficient to the multiplier 351C-1.

As described above, in the equalizer 35B-1, the filter coefficient is updated by the correlation between the main signal and the error vector signal.

Returning to the description of FIG. 4, the interference compensation unit 35C-1 removes, by using the signal obtained by the OAM reception processing unit 34A-2, an interference component caused by horizontally polarized waves relative to vertically polarized waves from the signal which has been subjected to the distortion component removal processing and which is obtained by the equalizer 35B-1. For example, the interference compensation unit 35C-1 filters, by using a plurality of filter coefficients (hereinafter sometimes referred to as "a plurality of first filter coefficients"), the signal obtained by the OAM reception processing unit 34A-2, thereby forming a "horizontal interference component replica". The "horizontal interference component replica" is a replica of an interference component caused by the horizontally polarized waves relative to the vertically polarized waves. Then, the interference compensation unit 35C-1 subtracts the "horizontal interference component replica" from the signal which has been subjected to the distortion component removal processing and which is obtained by the equalizer 35B-1, and forms a signal that has been subjected to the interference compensation processing. Here, the interference compensation unit 35C-1 executes the interference compensation processing while adjusting (updating) the plurality of first filter coefficients based on the "first error vector signal" received from the hard decision unit 35D-1 described later. Thus, adaptive interference compensation processing can be performed.

Figure 9:
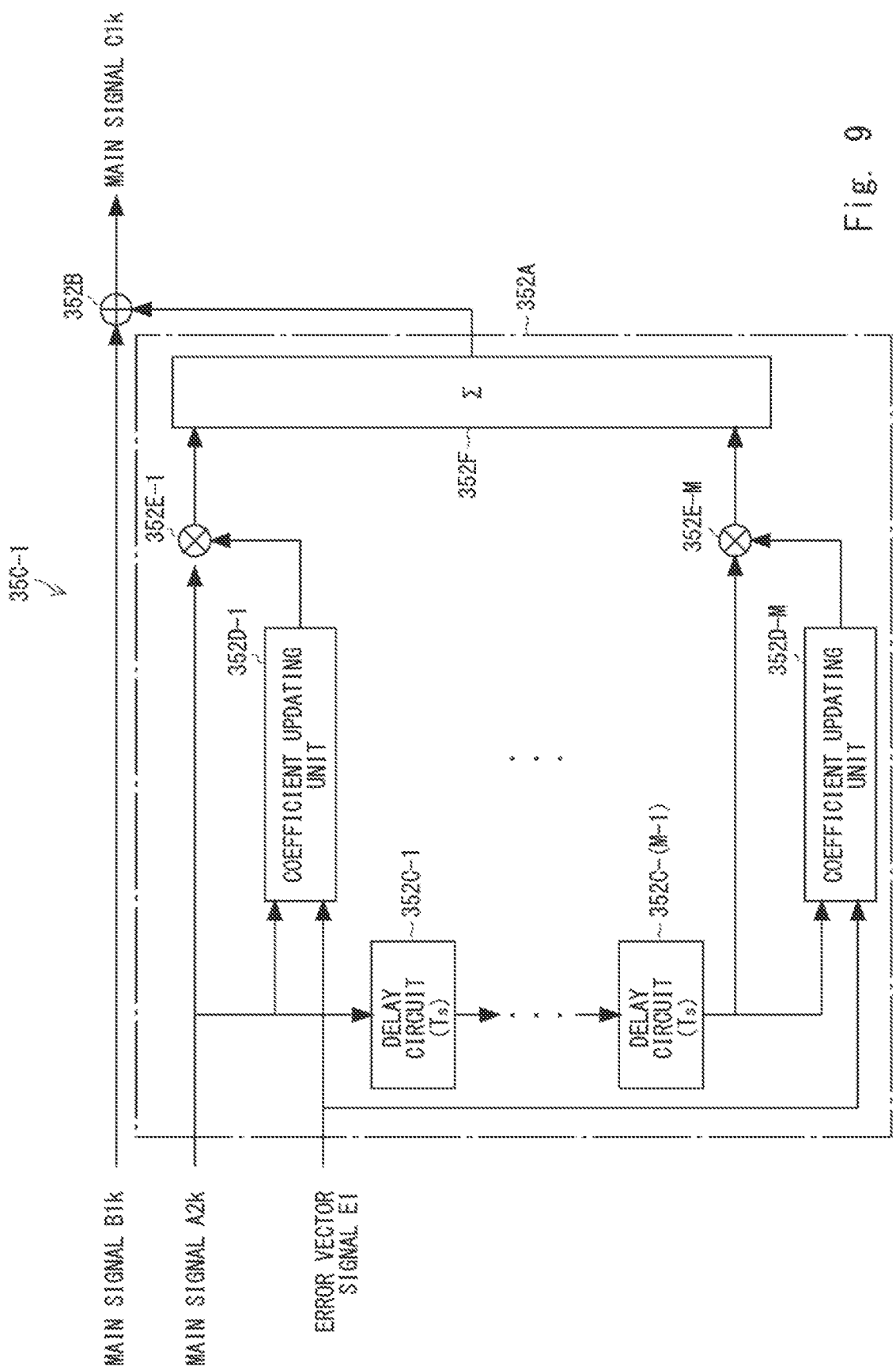
FIG. 9 is a block diagram showing an example of an interference compensation unit in the OAM reception apparatus according to the second example embodiment.

FIG. 9 is a block diagram showing an example of the interference compensation unit in the OAM reception apparatus according to the second example embodiment. In FIG. 9, the interference compensation unit 35C-1 includes an interference component replica forming unit 352A and an adder (subtracter) 352B. Note that an interference compensation unit 35C-2 has the same configuration as that of the interference compensation unit 35C-1. In FIG. 9, a main signal B1$k$ is a signal that has been subjected to the distortion component removal processing output from the equalizer 35B-1. Further, a main signal A2$k$ is a signal that has been subjected to the OAM reception processing output from the OAM reception processing unit 34A-2. Further, the error vector signal E1 represents the error vector signal output from the hard decision unit 35D-1 described later.

The interference component replica forming unit 352A filters, by using a plurality of filter coefficients, the signal A2$k$ obtained by the OAM reception processing unit 34A-2, thereby forming the interference component replica.

As shown in FIG. 9, the interference component replica forming unit 352A includes delay circuits 352C-1 to 352C-(M-1), coefficient updating units 352D-1 to 352D-M, multipliers 352E-1 to 352E-M, and an adder 352F.

Each of the delay circuits 352C-1 to 352C-(M-1) delays the input main signal by a time Ts and outputs the delayed signal. The delay circuits 352C-1 to 352C-(M-1) are disposed in the input stages of the coefficient updating units 352D-2 to 352D-M, respectively. Thus, M main signals A2$k$ shifted by the time Ts are input to the coefficient updating units 352D-1 to 352D-M around the same time.

Each coefficient updating unit 352D updates the filter coefficient held by each coefficient updating unit 352D based on the input main signal A2$k$ and the error vector signal E1, and outputs the updated filter coefficient to the multiplier 352E.

Each multiplier 352E multiplies the main signal A2$k$ by the filter coefficient and outputs the multiplication result to the adder 352F.

The adder 352F adds the M multiplication results received from the multipliers 352E-1 to 352E-M, and outputs the addition result as the interference component replica. As described above, the interference component replica forming unit 352A is, for example, an FIR (Finite Impulse Response) filter.

The adder (subtracter) 352B subtracts the interference component replica from the main signal B1$k$ and outputs a signal C1$k$ that has been subjected to the interference compensation processing.

Figure 10:
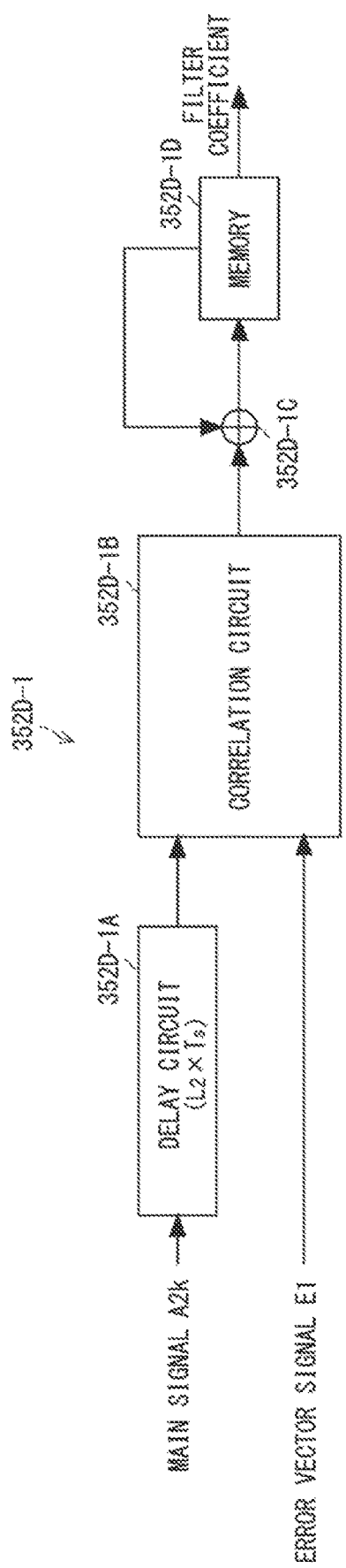
FIG. 10 is a block diagram showing an example of the coefficient updating unit.

FIG. 10 is a block diagram showing an example of the coefficient updating unit. Since the configurations of the coefficient updating units 352D-1 to 352D-M are the same, the configuration of the coefficient updating unit 352D-1 is shown in FIG. 10 as an example. In FIG. 10, the coefficient updating unit 352D-1 includes a delay circuit 352D-1A, a correlation circuit 352D-1B, an adder 352D-1C, and a memory 352D-1D. In FIG. 10, the main signal A2$k$ is a signal that has been subjected to the OAM reception processing output from the OAM reception processing unit 34A-2. Further, the error vector signal E1 represents the error vector signal output from the hard decision unit 35D-1 described later.

The delay circuit 352D-1A holds the input main signal A2$k$ for a period of time ($L_2 \times Ts$) and then outputs the main signal A2$k$. In other words, the delay circuit 352D-1A delays the input main signal A2$k$ by the time ($L_2 \times Ts$). The time ($L_2 \times Ts$) corresponds to the time (i.e., feedback delay time) required until the error vector signal E1 corresponding to the main signal A2$k$ at a certain timing is fed back. $L_2$ represents the number of symbol times Ts included in the feedback delay time. That is, since the delay circuit 352D-1A delays the main signal A2$k$ by the feedback delay time, the main signal A2$k$ and the error vector signal corresponding to the main signal B1$k$, which is input around the same time as the main signal A2$k$, are input to the correlation circuit 352D-1B around the same time.

The correlation circuit 352D-1B calculates a correlation value using the main signal A2k and the error vector signal E1, and outputs the calculated correlation value to the adder 352D-1C.

The adder 352D-1C adds the correlation value received from the correlation circuit 352D-1B and the filter coefficient received from the memory 352D-1D, and outputs the addition result to the memory 352D-1D.

The memory 352D-1D outputs the filter coefficient (holding filter coefficient) held by the memory 352D-1D to the adder 352D-1C, updates the holding filter coefficient according to the addition result received from the adder 352D-1C, and outputs the updated holding filter coefficient to the multiplier 352E-1.

As described above, the interference compensation unit 35C-1 updates the filter coefficient by the correlation between the main signal A2k and the error vector signal E1.

Returning to the description of FIG. 4, the hard decision unit 35D-1 specifies a "first symbol" based on a reception signal point (hereinafter sometimes referred to as a "first reception signal point") on the constellation corresponding to the signal which has been subjected to the interference compensation processing and which is obtained by the interference compensation unit 35C-1. For example, the hard decision unit 35D-1 specifies a symbol closest to the "first reception signal point" as the "first symbol", from among a plurality of symbols on the constellation corresponding to the modulation method (PSK (phase-shift keying), QAM (quadrature amplitude modulation), etc.) used in the OAM transmission apparatus 10. Then, the hard decision unit 35D-1 outputs, for example, a difference vector between the "first reception signal point" and the "first symbol" as the "first error vector signal" indicating a difference between the "first reception signal point" and the "first symbol".

The frame synchronization unit 35E-1 detects a frame start timing by pattern matching between a known signal transmitted by vertically polarized waves from the OAM transmission apparatus 10 and received by the OAM reception apparatus 30 and a known signal held in advance. Then, the frame synchronization unit 35E-1 outputs the detected frame start timing to the channel matrix estimation unit 34B-1. Thus, the channel matrix estimation unit 34B-1 can extract a known signal disposed at a predetermined timing in the frame.

The demodulation processing unit 35A-2 includes the equalizer 35B-2, the interference compensation unit 35C-2, the hard decision unit 35D-2, and a frame synchronization unit 35E-2. The configurations of the equalizer 35B-2, the interference compensation unit 35C-2, the hard decision unit 35D-2, and the frame synchronization unit 35E-2 are basically the same as those of the equalizer 35B-1, the interference compensation unit 35C-1, the hard decision unit 35D-1, and the frame synchronization unit 35E-1, respectively.

The equalizer 35B-2 outputs, to the interference compensation unit 35C-2, a signal that has been subjected to the distortion component removal processing; that is, a signal that is obtained by removing a distortion component from the signal obtained by the OAM reception processing unit 34A-2. For example, the equalizer 35B-2 filters, by using a plurality of filter coefficients (hereinafter sometimes referred to as "a plurality of fourth filter coefficients"), the signal obtained by the OAM reception processing unit 34A-2, thereby eliminating the distortion component. Here, the equalizer 35B-2 executes the distortion component removal processing while adjusting (updating) the plurality of fourth filter coefficients based on the "second error vector signal" received from the hard decision unit 35D-2 described later.

The interference compensation unit 35C-2 removes, by using the signal obtained by the OAM reception processing unit 34A-1, an interference component caused by vertically polarized waves relative to horizontally polarized waves from the signal which has been subjected to the distortion component removal processing and which is obtained by the equalizer 35B-2. For example, the interference compensation unit 35C-2 filters, by using a plurality of filter coefficients (hereinafter sometimes referred to as "a plurality of second filter coefficients"), the signal obtained by the OAM reception processing unit 34A-1, thereby forming a "vertical interference component replica". The "vertical interference component replica" is a replica of an interference component caused by the vertically polarized waves relative to the horizontally polarized waves. Then, the interference compensation unit 35C-2 subtracts the "vertical interference component replica" from the signal which has been subjected to the distortion component removal processing and which is obtained by the equalizer 35B-2, and forms a signal that has been subjected to the interference compensation processing. Here, the interference compensation unit 35C-2 executes the interference compensation processing while adjusting (updating) the plurality of second filter coefficients based on the "second error vector signal" received from the hard decision unit 35D-2 described later.

The hard decision unit 35D-2 specifies a "second symbol" based on a reception signal point (hereinafter sometimes referred to as a "second reception signal point") on the constellation corresponding to the signal which has been subjected to the interference compensation processing and which is obtained by the interference compensation unit 35C-2. For example, the hard decision unit 35D-2 specifies a symbol closest to the "second reception signal point" as the "second symbol", from among a plurality of symbols on the constellation corresponding to the modulation method (PSK (phase-shift keying), QAM (quadrature amplitude modulation), etc.) used in the OAM transmission apparatus 10. Then, the hard decision unit 35D-2 outputs, for example, a difference vector between the "second reception signal point" and the "second symbol" as the "second error vector signal" indicating a difference between the "second reception signal point" and the "second symbol".

The frame synchronization unit 35E-2 detects a frame start timing by pattern matching between a known signal transmitted by horizontally polarized waves from the OAM transmission apparatus 10 and received by the OAM reception apparatus 30 and a known signal held in advance. Then, the frame synchronization unit 35E-2 outputs the detected frame start timing to the channel matrix estimation unit 34B-2. Thus, the channel matrix estimation unit 34B-2 can extract a known signal disposed at a predetermined timing in the frame.

<Operation Example of OAM Transmission System>

An operation example of the OAM transmission system with the above configuration will be described.

<Operation Example of OAM Transmission Apparatus>

Figure 11:
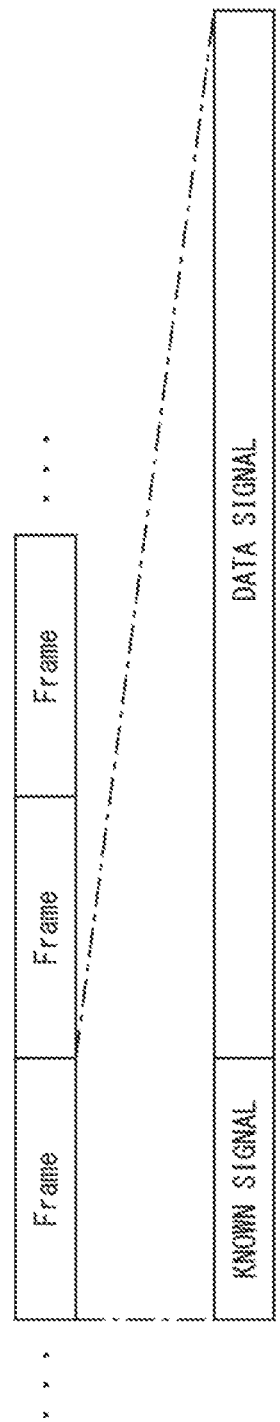
FIG. 11 is a diagram for explaining a frame.

The OAM transmission apparatus 10 transmits a signal using a plurality of consecutive frames. FIG. 11 is a diagram for explaining the frame.

As shown in FIG. 11, in each frame, a "known signal sequence (pilot signal sequence)" is mapped to a head part of the frame, and a "data signal sequence" is mapped to a part of the frame other than the head part thereof. The pattern of the known signal sequence transmitted by vertically polarized waves differs from the pattern of the known signal sequence transmitted by horizontally polarized waves. That is, the pattern of the known signal sequence input to the modulator 11 differs from the pattern of the known signal sequence input to the modulator 21.

In the modulators 11 and 21, BPSK or QPSK is used as a modulation method for a known signal sequence. On the other hand, in the modulators 11 and 21, BPSK, QPSK, 16 QAM, 32 QAM, 64 QAM, 128 QAM, 256 QAM or the like is used as a modulation system for a data signal sequence.

<Operation Example of OAM Reception Apparatus>
<Frame Synchronization>

The OAM reception apparatus 30 turns on the OAM reception processing units 34A-1 and 34A-2 and the demodulation unit 35 in order to establish frame synchronization. The frame synchronization units 35E-1 and 35E-2 detect the frame start timing and outputs the detected frame start timing to the channel matrix estimation units 34B-1 and 34B-2. Then, the OAM reception apparatus 30 turns off the OAM reception processing units 34A-1 and 34A-2.

<Estimation of Channel Matrix and Calculation of Initial Value of OAM Reception Weight Vector>

The OAM reception apparatus 30 turns on the channel matrix estimation units 34B-1 and 34B-2 and the weight calculation units 34C-1 and 34C-2. Then, the channel matrix estimation units 34B-1 and 34B-2 extract a "known signal" from the signal that has been subjected to the reception radio processing and received from the reception radio unit 33 based on the frame start timing, and calculates the channel matrix based on the extracted "known signal".

The weight calculation units 34C-1 and 34C-2 correct the conjugate transpose matrix of the "basic weight vector" corresponding to the "used OAM mode" based on the channel matrix calculated by the channel matrix estimation units 34B-1 and 34B-2 and calculate an initial value of the "OAM reception apparatus vector". The weight calculation units 34C-1 and 34C-2 set the initial value of the calculated "OAM reception weight vector" in the OAM reception processing units 34A-1 and 34A-2. Then, the OAM reception apparatus 30 turns off the channel matrix estimation units 34B-1 and 34B-2 and the weight calculation units 34C-1 and 34C-2.

<Reception of Data Signals>

The OAM reception apparatus 30 turns on the OAM reception processing units 34A-1 and 34A-2. Then, the OAM reception processing units 34A-1 and 34A-2 execute the "OAM reception processing" while adjusting (updating) the "OAM reception weight vector" based on the "error vector signal" received from the hard decision units 35D-1 and 35D-2.

Each of the equalizers 35B-1 and 35B-2 executes the distortion component removal processing while adjusting (updating) the plurality of filter coefficients based on the "error vector signal" received from the corresponding hard decision units 35D-1 and 35D-2.

Each of the interference compensation units 35C-1 and 35C-2 performs the interference compensation processing while adjusting (updating) a plurality of filter coefficients based on the "error vector signal" received from the corresponding hard decision units 35D-1 and 35D-2.

Each of the hard decision units 35D-1 and 35D-2 specifies a "symbol" based on the reception signal point on the constellation corresponding to the signal which has been subjected to the interference compensation processing and which is obtained by the corresponding interference compensation units 35C-1 and 35C-2. Each of the hard decision units 35D-1 and 35D-2 outputs an error vector signal indicating a difference between the specified "symbol" and the reception signal point to the OAM reception processing units 34A-1 and 34A-2, the equalizers 35B-1 and 35B-2, and the interference compensation units 35C-1 and 35C-2. Note that the symbol specified by each of the hard decision units 35D-1 and 35D-2 is output to a function unit (not shown) in a subsequent stage of the demodulation unit 35.

Here, the update of the initial value of the "OAM reception weight matrix" is performed at intervals of a frame period even at the most frequent interval, because the known signal is used for calculating the channel matrix. On the other hand, the OAM reception processing units 34A-1 and 34A-2 sequentially (e.g., at intervals of a symbol period) adjust (update) the "OAM reception weight vector" based on the "error vector signal" received from the hard decision units 35D-1 and 35D-2. By doing so, the OAM reception processing can be executed using the "OAM reception weight vector" that is more suitable for the communication status between the OAM transmission apparatus 10 and the OAM reception apparatus 30. As described above, since the OAM signal weight vector that is suitable for the communication status is obtained by the sequential adjustment of the OAM reception weight vector, the initialization of the OAM signal weight vector by the weight calculation units 34C-1 and 34C-2 may be executed, for example, at the time of starting the communication.

As described above, according to the second example embodiment, the OAM reception apparatus 30 includes the OAM reception processing units 34A-1 and 34A-2, and the interference compensation units 35C-1 and 35C-2. The OAM reception processing unit 34A-1 multiplies vertical component reception signals received from the reception radio units 33A-1, 33B-1, 33C-1, and 33D-1 by the "first OAM reception weight vector", thereby executing the first OAM reception processing. The OAM reception processing unit 34A-2 multiplies horizontal component reception signals received from the reception radio units 33A-2, 33B-2, 33C-2, and 33D-2 by the "second OAM reception weight vector", thereby executing the second OAM reception processing. The interference compensation unit 35C-1 removes, by using the signal obtained by the second OAM reception processing, an interference component caused by the horizontally polarized waves relative to the vertically polarized waves from the signal obtained by the first OAM reception processing. The interference compensation unit 35C-2 removes, by using the signal obtained by the first OAM reception processing, an interference component caused by the vertically polarized waves relative to the horizontally polarized waves from the signal obtained by the second OAM reception processing.

By the above configuration of the OAM reception apparatus 30, it is possible to receive, with inter-polarization interference compensation, a signal wirelessly transmitted by a combination of OAM transmission and dual polarized wave transmission.

Further, in the OAM reception apparatus 30, the OAM reception processing unit 34A-1 executes the "first OAM reception processing" while adjusting (updating) the "first OAM reception weight vector" based on the "first error vector signal" received from the hard decision unit 35D-1. Further, the OAM reception processing unit 34A-2 executes the "second OAM reception processing" while adjusting (updating) the "second OAM reception weight vector" based on the "second error vector signal" received from the hard decision unit 35D-2.

By the above configuration of the OAM reception apparatus 30, adaptive OAM reception processing can be performed.

Further, in the OAM reception apparatus 30, the channel matrix estimation unit 34B-1 calculates the first channel matrix related to channels among a plurality of transmission antenna elements and a plurality of reception antenna elements based on known signals transmitted by vertically polarized waves from the OAM transmission apparatus 10. The channel matrix estimation unit 34B-2 calculates the second channel matrix related to channels among a plurality of transmission antenna elements and a plurality of reception antenna elements based on known signals transmitted by horizontally polarized waves from the OAM transmission apparatus 10. The weight calculation unit 34C-1 corrects the conjugate transpose matrix of the basic weight vector corresponding to the used OAM mode based on the first channel matrix and calculates an initial value of the first OAM reception weight vector. The weight calculation unit 34C-2 corrects the conjugate transpose matrix of the basic weight vector corresponding to the used OAM mode based on the second channel matrix and calculates an initial value of the second OAM reception weight vector.

By the above configuration of the OAM reception apparatus 30, it is possible to calculate the initial value of the OAM reception weight vector suitable for an acceptable accuracy range with respect to the communication status between the OAM transmission apparatus 10 and the OAM reception apparatus 30.

Further, in the OAM reception apparatus 30, the OAM reception processing unit 34A-1 adjusts the first OAM reception weight vector based on the first error vector signal corresponding to the data signal transmitted by the vertically polarized waves. The OAM reception processing unit 34A-2 adjusts the second OAM reception weight vector based on the second error vector signal corresponding to the data signal transmitted by the horizontally polarized waves. Here, the OAM transmission apparatus 10 transmits a known signal at the head part of each frame, and transmits a data signal at a data transmission part of each frame other than the head part thereof.

Since the OAM reception weight vector can be adjusted at intervals of a symbol period by the above configuration of the OAM reception apparatus 30, the OAM reception weight vector can be made close to a value that is more suitable for the communication status between the OAM transmission apparatus 10 and the OAM reception apparatus 30 at a higher speed.

Third Example Embodiment

A third example embodiment relates to an example embodiment related to OAM mode multiplex transmission. Since the modes are basically independent of one another, the third example embodiment is almost the same as the second embodiment when focusing on each mode. The following description will be given, with a focus on differences between the third example embodiment and the second example embodiment.

<Configuration Example of OAM Transmission Apparatus>

Figure 12:
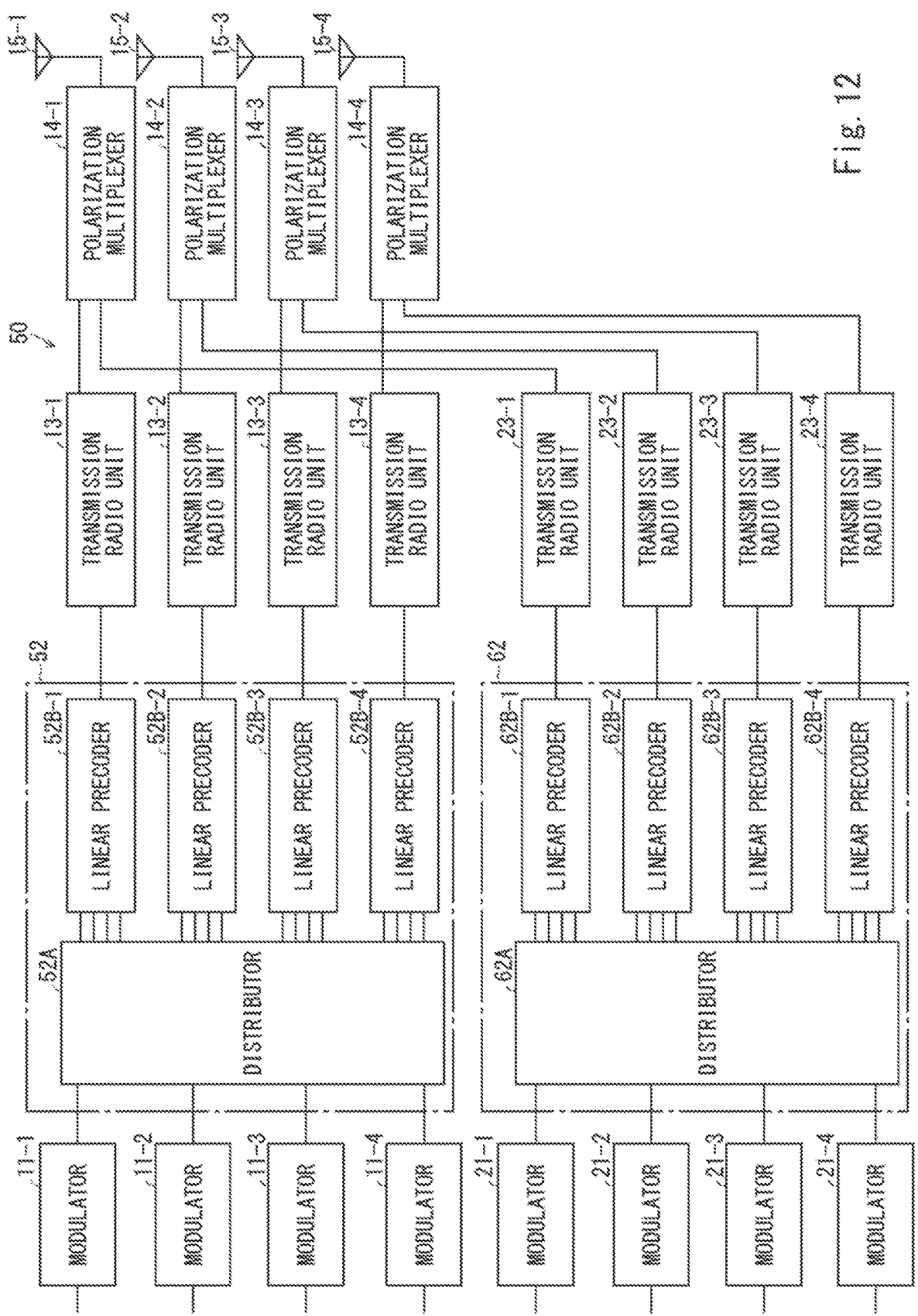
FIG. 12 is a block diagram showing an example of an OAM transmission apparatus according to a third example embodiment.

FIG. 12 is a block diagram showing an example of an OAM transmission apparatus according to the third example embodiment. In FIG. 12, an OAM transmission apparatus 50 includes modulators 11-1 to 11-4 and 21-1 to 21-4, and signal forming units 52 and 62. Further, the signal forming unit 52 includes a distributor 52A and linear precoders 52B-1 to 52B-4. Further, the signal forming unit 62 includes a distributor 62A and linear precoders 62B-1 to 62B-4.

The modulators 11-1 to 11-4 and 21-1 to 21-4 receive different transmission streams. Then, each of the modulators 11-1 to 11-4 and 21-1 to 21-4 modulates the input transmission stream and outputs a resulting modulated signal (i.e., symbols). That is, four different symbols are output from the modulators 11-1 to 11-4 around the same time. Four different symbols are also output from the modulators 21-1 to 21-4 around the same time. The modulators 11-1 to 11-4 and 21-1 to 21-4 correspond to a plurality of combinations of a plurality of used OAM modes and vertically and horizontally polarized waves, respectively. Further, the patterns of known signal sequences input to the modulators 11-1 to 11-4 and 21-1 to 21-4 are different from each other. Thus, known signal sequences having different patterns are transmitted by the plurality of combinations of the plurality of used OAM modes and vertically and horizontally polarized waves.

In the signal forming unit 52, the distributor 52A outputs each of the four symbols input around the same time to the four linear precoders 52B-1 to 52B-4. That is, the distributor 52A distributes the symbol received from the modulator 11-1 to the four linear precoders 52B-1 to 52B-4 to be input to the four linear precoders 52B-1 to 52B-4, respectively. The same applies to the symbol received from each of the modulators 11-2 to 11-4. That is, a symbol vector composed of four symbols input to the distributor 52A around the same time is input to each linear precoder 52B.

The linear precoders 52B-1 to 52B-4 correspond to four row vectors of "basic weight matrix (OAM transmission weight matrix)", respectively, corresponding to the plurality of used OAM modes. A plurality of column vectors of "basic weight matrix (OAM transmission weight matrix)" correspond to the plurality of used OAM modes, respectively.

FIG. 13 shows an example of the basic weight matrix (OAM transmission weight matrix). In the example of the basic weight matrix (OAM transmission weight matrix) shown in FIG. 13, four column vectors having column numbers 0, 1, 2, and 3 correspond to modes 0, 1, 2, and 3, respectively. That is, the amount of shift (amount of phase change) between the values of the four vector elements in the column vector of column number 0 is zero. The amount of shift (amount of phase change) between the values of the four vector elements in the column vector of column number 1 is $\pi/2$. Further, the amount of shift (amount of phase change) between the values of the four vector elements in the column vector of column number 2 is it. Further, the amount of shift (amount of phase change) between the values of the four vector elements in the column vector of column number 3 is $3\pi/2$. In the following description, it is assumed that the plurality of used OAM modes comprise four OAM modes: mode 0, mode 1, mode 2, and mode 3.

Returning to the description of FIG. 12, each linear precoder 52B multiplies the input symbol vector by the row vector corresponding to the linear precoder 52B. Then, a multiplexed signal is formed. Each linear precoder 52B outputs the formed multiplexed signal to the corresponding transmission radio unit 13.

The distributor 62A and linear precoders 62B-1 to 62B-4 of the signal forming unit 62 perform the same processing as that of the distributor 52A and linear precoders 52B-1 to 52B-4, respectively.

That is, the distributor 62A outputs each of the four symbols input around the same time to the four linear precoders 62B-1 to 62B-4.

The linear precoders 62B-1 to 62B-4 correspond to four row vectors of the "basic weight matrix (OAM transmission weight matrix)", respectively, corresponding to the plurality of used OAM modes. The plurality of used OAM modes used in the linear precoders 62B-1 to 62B-4 are the same as the plurality of used OAM modes used in the linear precoder 52B-1 to 52B-4. That is, the "basic weight matrix (OAM transmission weight matrix)" used in the linear precoders 62B-1 to 62B-4 is the same as the "basic weight matrix (OAM transmission weight matrix)" used in the linear precoders 52B-1 to 52B-4.

Then, each linear precoder 62B outputs the formed multiplexed signal to the corresponding transmission radio unit 23.

As described above, a plurality of radio signals which are mode-multiplexed for a plurality of OAM modes and polarization-multiplexed are transmitted from the antenna elements 15-1 to 15-4 in the OAM transmission apparatus 50.

<Configuration Example of OAM Reception Apparatus>

Figure 14:
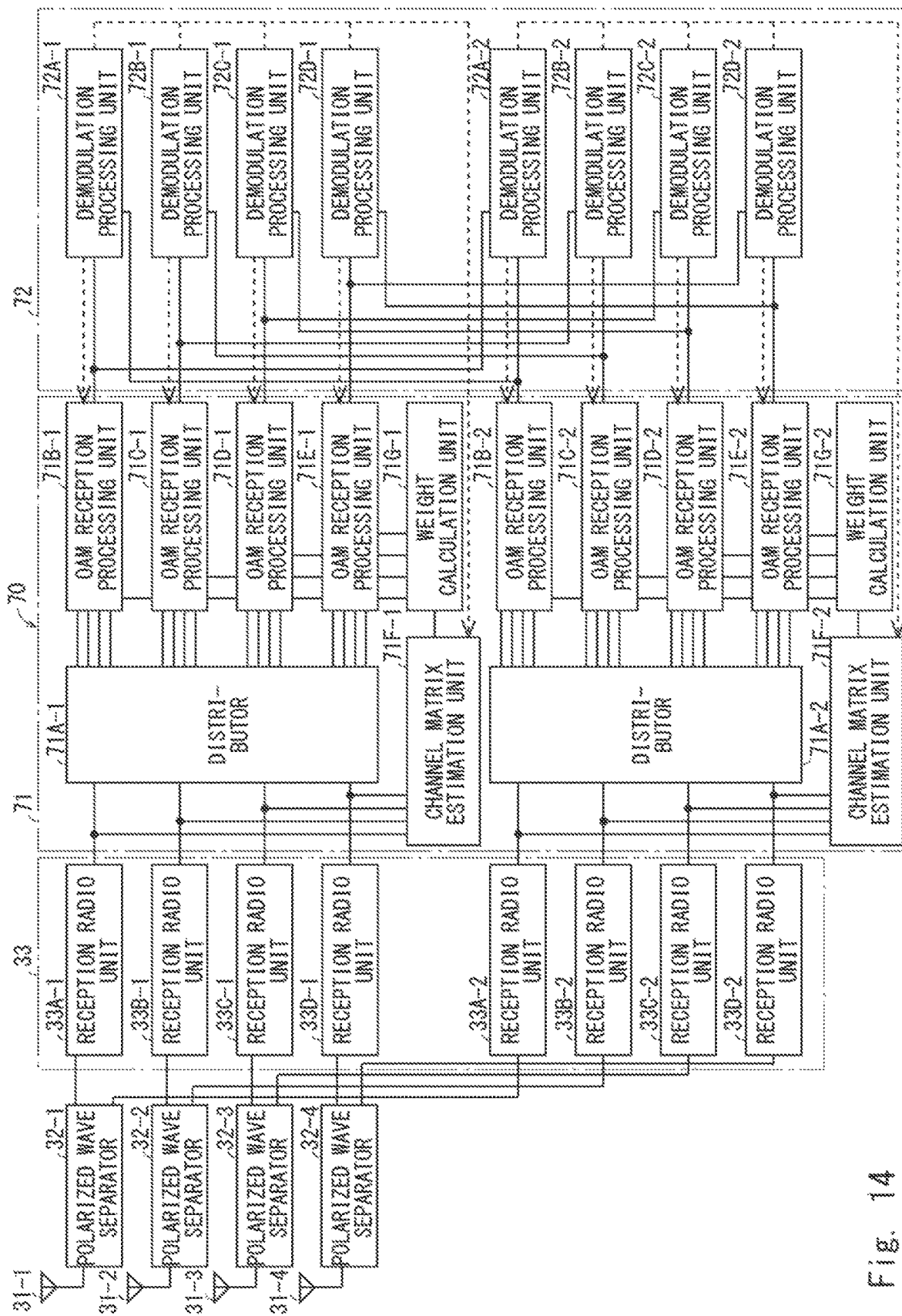
FIG. 14 is a block diagram showing an example of an OAM reception apparatus according to the third example embodiment.

FIG. 14 is a block diagram showing an example of the OAM reception apparatus according to the third example embodiment. In FIG. 14, the OAM reception apparatus 70 includes an OAM reception unit 71 and a demodulation unit 72.

The OAM reception unit 71 includes a distributor 71A-1, OAM reception processing units 71B-1, 71C-1, 71D-1, 71E-1, a channel matrix estimation unit 71F-1, and a weight calculation unit 71G-1, which are function units that execute OAM reception processing corresponding to vertical component signals. Further, the OAM reception unit 71 includes a distributor 71A-2, OAM reception processing units 71B-2, 71C-2, 71D-2, and 71E-2, a channel matrix estimation unit 71F-2, and a weight calculation unit 71G-2, which are function units that execute OAM reception processing corresponding to horizontal component signals.

The distributor 71A-1 outputs, to the OAM reception processing unit 71B-1, 71C-1, 71D-1, and 71E-1, each of the four signals which have been received around the same time from the reception radio units 33A-1, 33B-1, 33C-1, and 33D-1 and have been subjected to the reception radio processing. That is, the distributor 71A-1 distributes the signal that has been subjected to the radio processing and received from the reception radio unit 33A-1 to the OAM reception processing unit 71B-1, 71C-1, 71D-1, and 71E-1 to be input to the OAM reception processing unit 71B-1, 71C-1, 71D-1, and 71E-1. The same applies to the signals that have been subjected to the reception radio processing and received from the reception radio units 33B-1, 33C-1, and 33D-1. That is, the OAM reception processing unit 71B-1, 71C-1, 71D-1, and 71E-1 receive a reception signal vector composed of four signals that have been subjected to the reception radio processing and received around the same time from the reception radio units 33A-1, 33B-1, 33C-1, and 33D-1.

The OAM reception processing units 71B-1, 71C-1, 71D-1, and 71E-1 correspond to four row vectors (i.e., four OAM reception weight vectors) of the "OAM reception weight matrix", respectively. That is, the OAM reception processing units 71B-1, 71C-1, 71D-1, and 71E-1 correspond to the four used OAM modes, respectively. Here, the OAM reception processing units 71B-1, 71C-1, 71D-1, and 71E-1 correspond to mode 0, mode 1, mode 2, and mode 3, respectively.

Each of the OAM reception processing units 71B-1, 71C-1, 71D-1, and 71E-1 multiplies the input reception signal vector by the row vector of the "OAM reception weight matrix" corresponding to each of the OAM reception processing units 71B-1, 71C-1, 71D-1, and 71E-1. Here, like the OAM reception processing unit 34A-1, each of the OAM reception processing units 71B-1, 71C-1, 71D-1, and 71E-1 executes the OAM reception processing while adjusting the OAM reception weight vector based on the "error vector signals" received from demodulation processing units 72A-1, 72B-1, 72C-1, and 72D-1.

The channel matrix estimation unit 71F-1 calculates a "channel matrix" based on the four vertical component signals that have been subjected to the reception radio processing, the four vertical component signals that have been subjected to the reception radio processing being received from the reception radio units 33A-1, 33B-1, 33C-1, and 33D-1 and corresponding to known signals transmitted by vertically polarized waves from the OAM transmission apparatus 50. Here, as described above, known signal sequences having different patterns are transmitted from the OAM transmission apparatus 10 by the plurality of combinations of the plurality of used OAM modes and vertically and horizontally polarized waves. Thus, the channel matrix estimation unit 71F-1 can separate a plurality of known signal sequences having different patterns from each other, and thus it is possible to calculate the "channel matrix" reflecting the states of the respective combinations of channels.

The weight calculation unit 71G-1 corrects the conjugate transpose matrix of the above "basic weight matrix" based on the channel matrix calculated by the channel matrix estimation unit 71F-1 and calculates an initial value of the "OAM reception weight matrix". The initial value of the "OAM reception weight matrix" is set in the OAM reception processing units 71B-1, 71C-1, 71D-1, and 71E-1. The calculation of the channel matrix by the channel matrix estimation units 71F and the calculation of the initial value of the OAM reception weight matrix by the weight calculation units 71G will be described later in detail.

The distributor 71A-2, the OAM reception processing units 71B-2, 71C-2, 71D-2, and 71E-2, the channel matrix estimation unit 71F-2, and the weight calculation unit 71G-2 operate in a manner similar to that when the distributor 71A-1, the OAM reception processing units 71B-1, 71C-1, 71D-1, and 71E-1, the channel matrix estimation unit 71F-1, and the weight calculation unit 71G-1 operate, except that the former units operate using signals from the reception radio units 33A-2, 33B-2, 33C-2, and 33D-2.

The demodulation unit 72 includes the demodulation processing units 72A-1, 72B-1, 72C-1, and 72D-1, and demodulation processing units 72A-2, 72B-2, 72C-2, and 72D-2. Each of the demodulation processing units 72A-1, 72B-1, 72C-1, and 72D-1 corresponds to the demodulation processing unit 35A-1 according to the second example embodiment. Further, each of the demodulation processing units 72A-2, 72B-2, 72C-2, and 72D-2 corresponds to the demodulation processing unit 35A-2 according to the second example embodiment. Each of the demodulation processing units 72A-1 and 72A-2 corresponds to mode 0. Each of the demodulation processing units 72B-1 and 72B-2 corresponds to mode 1. Each of the demodulation processing units 72C-1 and 72C-2 corresponds to mode 2. Each of the demodulation processing units 72D-1 and 72D-2 corresponds to mode 3. That is, the relationship between the demodulation processing units 72A-1 and 72A-2 and the OAM reception processing units 71B-1 and 71B-2 is the same as the relationship between the demodulation processing units 35A-1 and 35A-2 and the OAM reception processing units 34A-1 and 34A-2 according to the second example embodiment. Similarly, the relationship between the demodulation processing units 72B-1 and 72B-2 and the OAM reception processing units 71C-1 and 71C-2 is the same as the relationship between the demodulation processing units 35A-1 and 35A-2 and the OAM reception processing units 34A-1 and 34A-2 according to the second example embodiment. The relationship between the demodulation processing units 72C-1 and 72C-2 and the OAM reception processing units 71D-1 and 71D-2 is the same as the relationship between the demodulation processing units 35A-1 and 35A-2 and the OAM reception processing units 34A-1 and 34A-2 according to the second example embodiment. The relationship between the demodulation processing units 72D-1 and 72D-2 and the OAM reception processing units 71E-1 and 71E-2 is the same as the relationship between the demodulation processing units 35A-1 and 35A-2 and the OAM reception processing units 34A-1 and 34A-2 according to the second example embodiment. That is, the OAM reception apparatus 70 includes the same number of sets of two OAM reception processing units and two demodulation processing units as the number of the plurality of used OAM modes (modes 0, 1, 2, and 3).

<Operation Example of OAM Transmission System>

An operation example of the OAM transmission system including the OAM transmission apparatus 50 and the OAM reception apparatus 70 having the above configuration will be described.

<Operation Example of OAM Transmission Apparatus>

The OAM transmission apparatus 50 transmits a known signal to the OAM reception apparatus 70 by using one used OAM mode (e.g., mode 0) and dual polarized waves, in order to establish frame synchronization. Then, the OAM transmission apparatus 50 transmits a known signal by using a plurality of used OAM modes and dual polarized waves in order to cause the OAM reception apparatus 70 to calculate the channel matrix. For example, the OAM transmission apparatus 50 may transmit a known signal by using one OAM mode and dual polarized waves in a first section of a frame, which is the first part of the head part of the frame, and transmit another known signal by using the plurality of used OAM modes and dual polarized waves in a second section of the frame, which is a part of the head part of the frame other than the first section.

Then, in the part of the frame other than the head part thereof, the OAM transmission apparatus 50 transmits the data signal sequence using the plurality of used OAM modes and dual polarized waves.

<Operation Example of OAM Reception Apparatus>
<Frame Synchronization>

The OAM reception apparatus 70 turns on the OAM reception processing units 71B-1 and 71B-2 and the demodulation processing units 72A-1 and 72A-2 in order to establish frame synchronization. Then, frame synchronization units of the demodulation processing units 72A-1 and 72A-2 detect the frame start timing and outputs the detected frame start timing to the channel matrix estimation units 71F-1 and 71F-2. Then, the OAM reception apparatus 70 turns off the OAM reception processing units 71B-1 and 71B-2.

<Estimation of Channel Matrix and Calculation of Initial Value of OAM Reception Weight Matrix>

The OAM reception apparatus 70 turns on the channel matrix estimation units 71F-1 and 71F-2 and the weight calculation units 71G-1 and 71G-2. Then, the channel matrix estimation units 71F-1 and 71F-2 extract a "known signal" from the signal that has been subjected to the reception radio processing and received from the reception radio unit 33 based on the frame start timing, and calculate the channel matrix based on the extracted "known signal".

The weight calculation units 71G-1 and 71G-2 correct the conjugate transpose matrix of the "basic weight matrix" based on the channel matrix calculated by the channel matrix estimation units 71F-1 and 71F-2 and calculate an initial value of the "OAM reception weight matrix". The weight calculation units 71G-1 and 71G-2 set the initial value of the calculated "OAM reception weight matrix" in the OAM reception processing units 71B-1, 71C-1, 71D-1, 71E-1, 71B-2, 71C-2, 71D-2, and 71E-2. Then, the OAM reception apparatus 70 turns off the channel matrix estimation units 71F-1 and 71F-2 and the weight calculation units 71G-1 and 71G-2.

<Reception of Data Signals>

The OAM reception apparatus 70 turns on the OAM reception processing units 71B-1, 71C-1, 71D-1, 71E-1, 71B-2, 71C-2, 71D-2, and 71E-2 and the demodulation processing units 72A-1, 72A-2, 72B-1, 72B-2, 72C-1, 72C-2, 72D-1, and 72D-2 and execute OAM reception processing and demodulation processing.

In the above description, although the OAM transmission apparatus 50 transmits a known signal using a plurality of used OAM modes and dual polarized waves in order to cause the OAM reception apparatus 70 to calculate the channel matrix, the present disclosure is not limited to this. The OAM transmission apparatus 50 may transmit a known signal using one used OAM mode (e.g., mode 0) and dual polarized waves to cause the OAM reception apparatus 70 to calculate the channel matrix.

Here, the calculation of the channel matrix by the channel matrix estimation units 71F and the calculation of the initial value of the OAM reception weight matrix by the weight calculation units 71G will be described in detail.

First, the relationship between the transmission signal and the reception signal can be expressed by the following formula (1).

[Formula 1]

$$y(t) = W_R H W_T x(t) \quad (1)$$

In this formula, y(t) is a reception signal (a signal after OAM separation, namely, a signal that has been subjected to the OAM reception processing) at a time t. Further, x(t) is a transmission signal (signal before OAM multiplexing) at the time t. H is a channel matrix. $W_T$ is an OAM transmission weight matrix. $W_R$ is an OAM reception weight matrix.

Next, an ideal state in which the transmission antenna element and the reception antenna element face each other is considered. At this time, the channel matrix H becomes a cyclic matrix ($H_{id}$). Here, it is assumed that the OAM transmission apparatus 50 includes a UCA antenna composed of N transmission antenna elements, and the OAM reception apparatus 70 includes a UCA antenna composed of N reception antenna elements.

Due to the properties of the cyclic matrix, "$W_R H W_T$" in the formula (1) can be diagonalized (A) using a DFT (Discrete Fourier Transform) matrix D. Thus, the formula (1) can be modified into the following formula (2).

[Formula 2]

$$y(t) = A x(t) \quad (2)$$

Here, A is expressed by the formula (3). Further, since A is a diagonal matrix, it can be expressed as the formula (4).

[Formula 3]

$$A = D^H H_{id} D \quad (3)$$

-continued

[Formula 4]

$$A = \begin{bmatrix} a_0 & & & 0 \\ & a_1 & & \\ & & \ddots & \\ 0 & & & a_{N-1} \end{bmatrix} \quad (4)$$

Here, when the UCA antenna of the OAM transmission apparatus 50 and the UCA antenna of the OAM reception apparatus 70 are actually installed, for example, a minute angle smaller than 1° is generated, so that the channel matrix H does not become a channel matrix $H_{id}$ in an ideal state.

A channel matrix $H_{nid}$ in the non-ideal state can be modeled by the following formula (5).

[Formula 5]

$$H = H_{nid} = RH_{id} \quad (5)$$

R is a matrix representing the difference between the channel matrix $H_{nid}$ in the non-ideal state and the channel matrix $H_{id}$ in the ideal state.

The relationship between the transmission signal and the reception signal at this time can be expressed by the following formula (6).

[Formula 6]

$$\begin{aligned} y(t) &= W_R H W_T x(t) \\ &= W_R R H_{id} W_T x(t) \end{aligned} \quad (6)$$

By using the conjugate transpose of the DFT matrix D corrected by an inverse matrix of R as the OAM reception weight matrix $W_R$ in the formula (6), the diagonalization as shown in the formula (2) becomes possible. Here, when the "conjugate transpose of the DFT matrix D corrected by an inverse matrix of R" is expressed by, for example, the following formula (7), the diagonalization (A) can be expressed by the following formula (8).

[Formula 7]

$$W_R = D^H R^{-1} \quad (7)$$

[Formula 8]

$$A = D^H R^{-1} R H_{id} D = D^H H_{id} D \quad (8)$$

Therefore, in order to obtain the OAM reception weight matrix expressed by the formula (7), the inverse matrix of R may be calculated. As described above, R represents the difference between the channel matrix $H_{id}$ in the ideal state and the channel matrix $H_{nid}$ in the non-ideal state.

First, calculating the channel matrix $H_{id}$ in the ideal state is equivalent to calculating the phase rotation based on the path ($d_{k,l}$) between the N transmission antenna elements and the N reception antenna elements in the ideal state. The amount of phase rotation based on each path can be geometrically calculated by design values, the "number of antenna elements (N)", an "array radius (r)", a "wavelength (λ)", and a "transmission distance (Z)" between transmission and reception measured at the time of installation. Here, the path ($d_{k,l}$) means a path between the k-th transmission antenna element and the l-th reception antenna element.

The path ($d_{k,l}$) can be expressed by the following formula (9). The channel matrix $H_{id}$ in the ideal state can be expressed by the following formula (10).

[Formula 9]

$$d_{k,l} = \left\{ \left( r\cos\left(\frac{2\pi k}{N}\right) - r\cos\left(\frac{2\pi l}{N}\right) \right)^2 + \left( r\sin\left(\frac{2\pi k}{N}\right) - r\sin\left(\frac{2\pi l}{N}\right) \right)^2 + Z^2 \right\}^{1/2} \quad (9)$$

[Formula 10]

$$H_{id} = \begin{bmatrix} e^{i\frac{2\pi}{\lambda}d_{0,0}} & e^{i\frac{2\pi}{\lambda}d_{0,1}} & \cdots & e^{i\frac{2\pi}{\lambda}d_{0,N-1}} \\ e^{i\frac{2\pi}{\lambda}d_{1,0}} & & \ddots & \\ \vdots & & & \\ e^{i\frac{2\pi}{\lambda}d_{N-1,0}} & & & e^{i\frac{2\pi}{\lambda}d_{N-1,N-1}} \end{bmatrix} \quad (10)$$

The channel matrix $H_{nid}$ in the non-ideal state can be estimated using a known signal (pilot signal (p)). The reception signal (y) and the pilot signal (p) have a relationship represented by the following formula (11).

[Formula 11]

$$y = H_{nid} D p = H_{nid} s \quad (11)$$

D is a DFT matrix having a matrix size of N×N.

Then, the estimated channel matrix $\hat{H}_{nid}$ can be calculated by matrix-multiplying the reception signal by a previously calculated matrix ($s^H V^{-1}$), as shown in the following formula (12).

[Formula 12]

$$y\{s^H V^{-1}\} = \hat{H}_{nid}\{ss^H (ss^H)^{-1}\} = \hat{H}_{nid} \quad (12)$$

As described above, the channel matrix estimation units 71F-1 and 71F-2 can calculate the channel matrix $\hat{H}_{nid}$ using, for example, the formula (12). The weight calculation units 71G-1 and 71G-2 calculate R using the channel matrix $\hat{H}_{nid}$ and the channel matrix $H_{id}$ in the ideal state. Then, the weight calculation units 71G-1 and 71G-2 can calculate the initial value of the "OAM reception weight matrix" by correcting the conjugate transpose of the DFT matrix (i.e., the base weight matrix) D by the inverse matrix of R, as shown in the formula (7).

As described above, according to the third example embodiment, the OAM reception apparatus 70 includes the same number of sets of two OAM reception processing units and two demodulation processing units (interference compensation units) as at least the number of plurality of used OAM modes.

By the above configuration of the OAM reception apparatus, it is possible to receive, with inter-polarization interference compensation, a signal wirelessly transmitted by a combination of OAM mode multiplex transmission and polarized wave transmission.

Although the present disclosure has been described with reference to the example embodiments, the present disclosure is not limited by the above. The configuration and details of the present disclosure may be modified in various ways as will be understood by those skilled in the art within the scope of the disclosure.

The whole or part of the example embodiments disclosed above can be described as, but not limited to, the following supplementary notes.

(Supplementary Note 1)

An OAM reception apparatus comprising:

a plurality of reception antenna elements configured to receive a plurality of radio signals respectively transmitted from a plurality of transmission antenna elements of an OAM (orbital angular momentum) transmission apparatus, each radio signal including a first OAM radio signal and a second OAM radio signal that are formed by a common OAM (orbital angular momentum) mode, the first OAM radio signal being transmitted by vertically polarized waves, the second OAM radio signal being transmitted by horizontally polarized waves; and OAM reception means and interference compensation means for executing OAM reception processing using an OAM reception weight vector and interference compensation processing for removing an interference component between the polarized waves, respectively, based on a plurality of vertical component signals and a plurality of horizontal component signals obtained by performing polarization separating and down-conversion on a plurality of reception radio signals received by the plurality of reception antenna elements, the OAM reception means and the interference compensation means being independent of each other.

(Supplementary Note 2)

The OAM reception apparatus according to Supplementary note 1, wherein the OAM reception means and the interference compensation means are connected in series.

(Supplementary Note 3)

The OAM reception apparatus according to Supplementary note 1 or 2, wherein the OAM reception means comprises:

first OAM reception processing means for executing first OAM reception processing by multiplying the plurality of vertical component reception signals by a first OAM reception weight vector; and second OAM reception processing means for executing second OAM reception processing by multiplying the plurality of horizontal component signals by a second OAM reception weight vector, and the interference compensation means comprises:

first interference compensation means for removing, by using a signal obtained by the second OAM reception processing, an interference component caused by the horizontally polarized waves relative to the vertically polarized waves from a signal obtained by the first OAM reception processing; and second interference compensation means for removing, by using a signal obtained by the first OAM reception processing, an interference component caused by the vertically polarized waves relative to the horizontally polarized waves from a signal obtained by the second OAM reception processing.

(Supplementary Note 4)

The OAM reception apparatus according to Supplementary note 3, further comprising:

first hard decision means for specifying a first symbol based on a first reception signal point on a constellation corresponding to a signal from which the interference component is removed by the first interference compensation means, and outputting a first error vector signal indicating a difference between the specified first symbol and the first reception signal point; and second hard decision means for specifying a second symbol based on a second reception signal point on a constellation corresponding to a signal from which the interference component is removed by the second interference compensation means, and outputting a second error vector signal indicating a difference between the specified second symbol and the second reception signal point, wherein the first OAM reception processing means is configured to adjust the first OAM reception weight vector based on the first error vector signal, and the second OAM reception processing means is configured to adjust the second OAM reception weight vector based on the second error vector signal.

(Supplementary Note 5)

The OAM reception apparatus according to Supplementary note 4, further comprising:

first channel matrix estimation means for calculating a first channel matrix related to a channel between the plurality of transmission antenna elements and the plurality of reception antenna elements based on a known signal transmitted by the vertically polarized waves from the OAM transmission apparatus;

second channel matrix estimation means for calculating a second channel matrix related to a channel between the plurality of transmission antenna elements and the plurality of reception antenna elements based on a known signal transmitted by the horizontally polarized waves from the OAM transmission apparatus;

first weight calculation means for correcting a conjugate transpose matrix of a basic reception weight vector corresponding to the common OAM mode based on the calculated first channel matrix and calculating an initial value of the first OAM reception weight vector; and second weight calculation means for correcting the conjugate transpose matrix of the basic reception weight vector based on the calculated second channel matrix and calculating an initial value of the second OAM reception weight vector.

(Supplementary Note 6)

The OAM reception apparatus according to Supplementary note 5, wherein the OAM transmission apparatus is configured to transmit the known signal at a head part of a frame, and transmit a data signal at a data transmission part of the frame other than the head part thereof, the first OAM reception processing means is configured to adjust the first OAM reception weight vector based on the first error vector signal corresponding to the data signal transmitted by the vertically polarized waves, and the second OAM reception processing means is configured to adjust the second OAM reception weight vector based on the second error vector signal corresponding to the data signal transmitted by the horizontally polarized waves.

(Supplementary Note 7)

The OAM reception apparatus according to Supplementary note 6, wherein the first interference compensation means comprises first interference component replica forming means for filtering, by using a plurality of first filter coefficients, a signal obtained by the second OAM reception processing and thereby forming a horizontal interference component replica by the horizontally polarized waves relative to the vertically polarized waves, the second interference compensation means comprises second interference component replica forming means for filtering, by using a plurality of second filter coefficients, a signal obtained by the first OAM reception processing and thereby forming a vertical interference component replica by the vertically polarized waves relative to the horizontally polarized waves, the first interference component replica forming means is configured to adjust the plurality of first filter coefficients based on the first error vector signal, and the second interference component replica forming means is configured to adjust the plurality of second filter coefficients based on the second error vector signal.

(Supplementary Note 8)

The OAM reception apparatus according to Supplementary note 7, further comprising:

first equalization means for filtering, by using a plurality of third filter coefficients, a signal obtained by the first OAM reception processing and thereby removing a distortion component, the first equalization means being provided between the first OAM reception processing means and the first interference compensation means; and second equalization means for filtering, by using a plurality of fourth filter coefficients, a signal obtained by the second OAM reception processing and thereby removing a distortion component, the second equalization means being provided between the second OAM reception processing means and the second interference compensation means, wherein the first equalization means is configured to adjust the plurality of third filter coefficients based on the first error vector signal, and the second equalization means is configured to adjust the plurality of fourth filter coefficients based on the second error vector signal.

(Supplementary Note 9)

The OAM reception apparatus according to any one of Supplementary notes 3 to 8, wherein the OAM transmission apparatus is further configured to transmit a plurality of mode-multiplexed radio signals as the plurality of radio signals, the plurality of mode-multiplexed radio signals being mode-multiplexed for a plurality of OAM modes, and the OAM reception apparatus comprises a plurality of sets of the first OAM reception processing means, the second OAM reception processing means, the first interference compensation means, and the second interference compensation means corresponding to the plurality of respective OAM modes.

(Supplementary Note 10)

An OAM reception method executed by an OAM reception apparatus comprising a plurality of reception antenna elements configured to respectively receive a plurality of radio signals that are respectively transmitted from a plurality of transmission antenna elements of an OAM (orbital angular momentum) transmission apparatus, each radio signal including a first OAM radio signal and a second OAM radio signal that are formed by a common OAM (orbital angular momentum) mode, the first OAM radio signal being transmitted by vertically polarized waves, the second OAM radio signal being transmitted by horizontally polarized waves, the OAM reception method comprising causing OAM reception means and interference compensation means to execute, on a plurality of vertical component signals and a plurality of horizontal component signals obtained by performing polarization separating and down-conversion on a plurality of reception radio signals received by the plurality of reception antenna elements, OAM reception processing using an OAM reception weight vector and interference compensation processing for removing an interference component between the polarized waves, the OAM reception means and the interference compensation means being independent of each other.

(Supplementary Note 11)

The OAM reception method according to Supplementary note 10, wherein the interference compensation processing is executed after the OAM reception processing is executed.

(Supplementary Note 12)

An OAM transmission system comprising an OAM transmission apparatus and an OAM reception apparatus, wherein the OAM transmission apparatus is configured to transmit a plurality of radio signals from a plurality of transmission antenna elements, each radio signal including a first OAM radio signal and a second OAM radio signal that are formed by a common OAM (orbital angular momentum) mode, the first OAM radio signal being transmitted by vertically polarized waves, the second OAM radio signal being transmitted by horizontally polarized waves, and the OAM reception apparatus comprises:

a plurality of reception antenna elements configured to receive the transmitted plurality of radio signals; and OAM reception means and interference compensation means for executing OAM reception processing using an OAM reception weight vector and interference compensation processing for removing an interference component between the polarized waves, respectively, on a plurality of vertical component signals and a plurality of horizontal component signals obtained by performing polarization separating and down-conversion on a plurality of reception radio signals received by the plurality of reception antenna elements, the OAM reception means and the interference compensation means being independent of each other.

(Supplementary Note 13)

The OAM transmission system according to Supplementary note 12, wherein the OAM reception means and the interference compensation means are connected in series.

This application is based upon and claims the benefit of priority from Japanese patent application No. 2018-207742, filed on Nov. 2, 2018, the disclosure of which is incorporated herein in its entirety by reference.

REFERENCE SIGNS LIST

1 OAM TRANSMISSION SYSTEM
10, 50 OAM TRANSMISSION APPARATUS
11, 21 MODULATOR
12, 22, 52, 62 SIGNAL FORMING UNIT
12A, 22A, 52A, 62A DISTRIBUTOR
12B, 22B, 52B, 62B LINEAR PRECODER
13 TRANSMISSION RADIO UNIT
14 POLARIZATION MULTIPLEXER
15 ANTENNA ELEMENT
23 TRANSMISSION RADIO UNIT
30, 70 OAM RECEPTION APPARATUS
31 ANTENNA ELEMENT
32 POLARIZED WAVE SEPARATOR
33 RECEPTION RADIO UNIT
34, 71 OAM RECEPTION UNIT
34A, 71B, 71C, 71D, 71E OAM RECEPTION PROCESSING UNIT
34B, 71F CHANNEL MATRIX ESTIMATION UNIT
34C, 71G WEIGHT CALCULATION UNIT
35, 72 DEMODULATION UNIT
35A, 72A, 72B, 72C, 72D DEMODULATION PROCESSING UNIT
35B EQUALIZER
35C INTERFERENCE COMPENSATION UNIT
35D HARD DECISION UNIT

35E FRAME SYNCHRONIZATION UNIT
71A DISTRIBUTOR
352A INTERFERENCE COMPONENT REPLICA FORMING UNIT

The invention claimed is:

1. An orbital angular momentum (OAM) reception apparatus comprising:
   a plurality of reception antenna elements configured to receive a plurality of radio signals respectively transmitted from a plurality of transmission antenna elements of an OAM (orbital angular momentum) transmission apparatus, each radio signal including a first OAM radio signal and a second OAM radio signal that are formed by a common OAM (orbital angular momentum) mode, the first OAM radio signal being transmitted by vertically polarized waves, the second OAM radio signal being transmitted by horizontally polarized waves;
   hardware including at least one processor and at least one memory; and
   OAM reception unit and interference compensation unit implemented at least by the hardware and that execute OAM reception processing using an OAM reception weight vector and interference compensation processing for removing an interference component between the vertically and horizontally polarized waves, respectively, based on a plurality of vertical component signals and a plurality of horizontal component signals obtained by performing polarization separating and down-conversion on a plurality of reception radio signals received by the plurality of reception antenna elements, the OAM reception unit and the interference compensation unit being independent of each other.

2. The OAM reception apparatus according to claim 1, wherein the OAM reception unit and the interference compensation unit are connected in series.

3. The OAM reception apparatus according to claim 1, wherein
   the OAM reception unit comprises:
      first OAM reception processing unit configured to execute first OAM reception processing by multiplying the plurality of vertical component signals by a first OAM reception weight vector; and
      second OAM reception processing unit configured to execute second OAM reception processing by multiplying the plurality of horizontal component signals by a second OAM reception weight vector, and
   the interference compensation unit comprises:
      first interference compensation unit configured to remove, by using a second signal obtained by the second OAM reception processing, a horizontal interference component caused by the horizontally polarized waves relative to the vertically polarized waves from a first signal obtained by the first OAM reception processing; and
      second interference compensation unit configured to remove, by using the first signal obtained by the first OAM reception processing, a second interference component caused by the vertically polarized waves relative to the horizontally polarized waves from the second signal obtained by the second OAM reception processing.

4. The OAM reception apparatus according to claim 3, further comprising:
   first hard decision unit implemented at least by the hardware and that specifies a first symbol based on a first reception signal point on a constellation corresponding to a third signal from which the interference component is removed by the first interference compensation unit, and that outputs a first error vector signal indicating a difference between the specified first symbol and the first reception signal point; and
   second hard decision unit implemented at least by the hardware and that specifies a second symbol based on a second reception signal point on a constellation corresponding to a fourth signal from which the interference component is removed by the second interference compensation unit, and that outputs a second error vector signal indicating a difference between the specified second symbol and the second reception signal point, wherein
   the first OAM reception processing unit is configured to adjust the first OAM reception weight vector based on the first error vector signal, and
   the second OAM reception processing unit is configured to adjust the second OAM reception weight vector based on the second error vector signal.

5. The OAM reception apparatus according to claim 4, further comprising:
   first channel matrix estimation unit implemented at least by the hardware and that calculates a first channel matrix related to a first channel between the plurality of transmission antenna elements and the plurality of reception antenna elements based on a first known signal transmitted by the vertically polarized waves from the OAM transmission apparatus;
   second channel matrix estimation unit implemented at least by the hardware and that calculates a second channel matrix related to a second channel between the plurality of transmission antenna elements and the plurality of reception antenna elements based on a second known signal transmitted by the horizontally polarized waves from the OAM transmission apparatus;
   first weight calculation unit implemented at least by the hardware and that corrects a conjugate transpose matrix of a basic reception weight vector corresponding to the common OAM mode based on the calculated first channel matrix and calculating a first initial value of the first OAM reception weight vector; and
   second weight calculation unit implemented at least by the hardware and that corrects the conjugate transpose matrix of the basic reception weight vector based on the calculated second channel matrix and calculating a second initial value of the second OAM reception weight vector.

6. The OAM reception apparatus according to claim 5, wherein
   the OAM transmission apparatus is configured to transmit each of the first known signal and the second known signal at a head part of a frame, and transmit a data signal at a data transmission part of the frame other than the head part thereof,
   the first OAM reception processing unit is configured to adjust the first OAM reception weight vector based on the first error vector signal corresponding to the data signal transmitted by the vertically polarized waves, and
   the second OAM reception processing unit is configured to adjust the second OAM reception weight vector based on the second error vector signal corresponding to the data signal transmitted by the horizontally polarized waves.

7. The OAM reception apparatus according to claim 6, wherein
   the first interference compensation unit comprises first interference component replica forming unit configured to filter, by using a plurality of first filter coefficients, the second signal obtained by the second OAM reception processing and thereby form a horizontal interference component replica by the horizontally polarized waves relative to the vertically polarized waves,
   the second interference compensation unit comprises second interference component replica forming unit configured to filter, by using a plurality of second filter coefficients, the first signal obtained by the first OAM reception processing and thereby form a vertical interference component replica by the vertically polarized waves relative to the horizontally polarized waves,
   the first interference component replica forming unit is configured to adjust the plurality of first filter coefficients based on the first error vector signal, and
   the second interference component replica forming unit is configured to adjust the plurality of second filter coefficients based on the second error vector signal.

8. The OAM reception apparatus according to claim 7, further comprising:
   first equalization unit implemented at least by the hardware and that filters, by using a plurality of third filter coefficients, the first signal obtained by the first OAM reception processing and thereby removes a distortion component, the first equalization unit being provided between the first OAM reception processing unit and the first interference compensation unit; and
   second equalization unit implemented at least by the hardware and that filters, by using a plurality of fourth filter coefficients, the second signal obtained by the second OAM reception processing and thereby removes a distortion component, the second equalization unit being provided between the second OAM reception processing unit and the second interference compensation unit, wherein
   the first equalization unit is configured to adjust the plurality of third filter coefficients based on the first error vector signal, and
   the second equalization unit is configured to adjust the plurality of fourth filter coefficients based on the second error vector signal.

9. The OAM reception apparatus according to claim 3, wherein
   the OAM transmission apparatus is further configured to transmit a plurality of mode-multiplexed radio signals as the plurality of radio signals, the plurality of mode-multiplexed radio signals being mode-multiplexed for a plurality of OAM modes, and
   the OAM reception apparatus comprises a plurality of sets of the first OAM reception processing unit, the second OAM reception processing unit, the first interference compensation unit, and the second interference compensation unit corresponding to the plurality of respective OAM modes.

10. An orbital angular momentum (OAM) reception method executed by an OAM reception apparatus comprising a plurality of reception antenna elements configured to respectively receive a plurality of radio signals that are respectively transmitted from a plurality of transmission antenna elements of an OAM transmission apparatus, each radio signal including a first OAM radio signal and a second OAM radio signal that are formed by a common OAM mode, the first OAM radio signal being transmitted by vertically polarized waves, the second OAM radio signal being transmitted by horizontally polarized waves, the OAM reception method comprising
   causing OAM reception unit and interference compensation unit to execute, on a plurality of vertical component signals and a plurality of horizontal component signals obtained by performing polarization separating and down-conversion on a plurality of reception radio signals received by the plurality of reception antenna elements, OAM reception processing using an OAM reception weight vector and interference compensation processing for removing an interference component between the vertically and horizontally polarized waves, the OAM reception unit and the interference compensation unit being independent of each other.

11. The OAM reception method according to claim 10, wherein the interference compensation processing is executed after the OAM reception processing is executed.

12. An orbital angular momentum (OAM) transmission system comprising an OAM transmission apparatus and an OAM reception apparatus, wherein
   the OAM transmission apparatus is configured to transmit a plurality of radio signals from a plurality of transmission antenna elements, each radio signal including a first OAM radio signal and a second OAM radio signal that are formed by a common OAM mode, the first OAM radio signal being transmitted by vertically polarized waves, the second OAM radio signal being transmitted by horizontally polarized waves, and
   the OAM reception apparatus comprises:
      a plurality of reception antenna elements configured to receive the transmitted plurality of radio signals;
      hardware including at least one processor and at least one memory; and
      OAM reception unit and interference compensation unit implemented at least by the hardware and that execute OAM reception processing using an OAM reception weight vector and interference compensation processing for removing an interference component between the vertically and horizontally polarized waves, respectively, on a plurality of vertical component signals and a plurality of horizontal component signals obtained by performing polarization separating and down-conversion on a plurality of reception radio signals received by the plurality of reception antenna elements, the OAM reception unit and the interference compensation unit being independent of each other.

13. The OAM transmission system according to claim 12, wherein the OAM reception unit and the interference compensation unit are connected in series.

* * * * *